(12) United States Patent
Obot et al.

(10) Patent No.: US 12,104,119 B2
(45) Date of Patent: *Oct. 1, 2024

(54) CALCAREOUS ROCK STIMULATION METHOD

(71) Applicant: King Fahd University of Petroleum and Minerals, Dhahran (SA)

(72) Inventors: Ime Bassey Obot, Dhahran (SA); Ahmad A. Sorour, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/621,135

(22) Filed: Mar. 29, 2024

(65) Prior Publication Data

US 2024/0279535 A1 Aug. 22, 2024

Related U.S. Application Data

(63) Continuation of application No. 18/058,022, filed on Nov. 22, 2022, now Pat. No. 11,987,752, which is a continuation of application No. 16/397,593, filed on Apr. 29, 2019, now Pat. No. 11,525,081.

(51) Int. Cl.
| | |
|---|---|
| *C09K 8/74* | (2006.01) |
| *C09K 8/54* | (2006.01) |
| *E21B 41/02* | (2006.01) |
| *E21B 43/25* | (2006.01) |

(52) U.S. Cl.
CPC .................. *C09K 8/74* (2013.01); *C09K 8/54* (2013.01); *E21B 41/02* (2013.01); *E21B 43/25* (2013.01); *C09K 2208/32* (2013.01)

(58) Field of Classification Search
CPC ........ C09K 2208/32; C09K 8/54; C09K 8/74; C23F 11/04; C23F 11/173; E21B 41/02; E21B 43/25
See application file for complete search history.

(56) References Cited

U.S. PATENT DOCUMENTS

| | | | |
|---|---|---|---|
| 5,099,924 | A | 3/1992 | Gidley |
| 6,326,335 | B1 | 12/2001 | Kowalski et al. |
| 7,621,334 | B2 | 11/2009 | Welton et al. |
| 2006/0243449 | A1 | 11/2006 | Welton |
| 2014/0116708 | A1 | 5/2014 | Wadekar et al. |

(Continued)

FOREIGN PATENT DOCUMENTS

| | | |
|---|---|---|
| CN | 101831659 B | 5/2013 |
| WO | 2007/007025 A1 | 1/2007 |

OTHER PUBLICATIONS

Peng, et al.; Study of gelatin as biodegradable shale hydration inhibitor; Colloids and Surfaces A 539; pp. 192-200; 2018; 10 Pages.

(Continued)

*Primary Examiner* — Alicia Bland
(74) *Attorney, Agent, or Firm* — Oblon, McClelland, Maier & Neustadt, L.L.P.

(57) ABSTRACT

A method of inhibiting corrosion of metal during acid stimulation of an oil and gas well that involves treating the oil and gas well with an acidic treatment fluid that includes 10 to 28 wt. % of an acid, based on a total weight of the acidic treatment fluid, and a corrosion inhibitor composition containing gelatin, wherein the gelatin is present in the acidic treatment fluid in a concentration of 0.1 to 10% by weight per total volume of the acidic treatment fluid.

15 Claims, 18 Drawing Sheets

(56) References Cited

U.S. PATENT DOCUMENTS

2014/0357537 A1  12/2014  Wadekar et al.
2016/0143989 A1  5/2016  Coulter

OTHER PUBLICATIONS

Jiang, et al. ; Improved shale hydration inhibition with combination of gelatin and KCl or EPTAC, an environmentally friendly inhibitor for water-based drilling fluids ; Journal of Applied Polymer Science, vol. 132, Issue 22 ; Feb. 1, 2019 ; Abstract Only ; 2 Pages.

Stankiewicz, et al. ; Gelatin microgels as a potential corrosion inhibitor carriers for self-healing coatings: preparation and codeposition ; Materials and Corrosion ; 25 Pages.

Sangeetha, et al. ; Synergistic effect of water soluble chitin and iodide ion on the corrosion inhibition of mild steel in acid medium ; Adv. Mater. Lett. 7(7) ; pp. 587-592 ; May 22, 2016 ; 7 Pages.

Sigma-Aldrich, Product information Gelatin, 3 pages, printed from sigma-aldrich.com on Apr. 6, 2022 (Year: 2022).

CALCAREOUS ROCK STIMULATION METHOD

CROSS-REFERENCE TO RELATED APPLICATIONS

The present application is a Continuation of U.S. application Ser. No. 18/058,022, now allowed, having a filing date of Nov. 22, 2022 which is a Continuation of U.S. application Ser. No. 16/397,593, now U.S. Pat. No. 11,525,081, having a filing date of Apr. 29, 2019.

STATEMENT REGARDING PRIOR DISCLOSURES BY THE INVENTORS

Aspects of this technology are described in an article "Gelatin: A green corrosion inhibitor for carbon steel in oil well acidizing environment" by K. Haruna, I. B. Obot, N. K. Ankah, A. A. Sorour, and T. A. Saleh, in Journal of Molecular Liquids, 2018, 264, 515-525, which is incorporated herein by reference in its entirety.

STATEMENT OF ACKNOWLEDGEMENT

The inventors would like to acknowledge the support received from King Abdulaziz City for Science and Technology (KACST) for funding this work under the National Science Technology Plan (NSTIP) grant no. 14-ADV2448-04. Also, the support provided by the Deanship of Scientific Research (DSR) and the Center of Research Excellence in Corrosion (CORE-C), at King Fahd University of Petroleum & Minerals (KFUPM) is gratefully acknowledged.

BACKGROUND OF THE INVENTION

Field of the Invention

The present invention relates to methods of inhibiting corrosion of metal during acid stimulation operations.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Corrosion is the deterioration of metallic materials by the chemical, electrochemical and metallurgical interaction with its environment. The corrosion of steel has very high environmental and economic impact, because of its wide used in many industries. Carbon steel is the most widely used material in the construction of oil and gas wells because of its low cost compared to other materials offering similar physical and chemical properties, but its corrosion resistance is very low. Corrosive substances that are present in the crude oil is one source of potential corrosion. The annual cost of corrosion in the oil and gas industry is estimated at £1.3 billion. See P. Rajeev, a O. Surendranathan, C. S. N. Murthy, Corrosion mitigation of the oil well steels using organic inhibitors—A review, J. Mater. Environ. Sci. 3 (2012) 856-869—incorporated herein by reference in its entirety.

Acidizing of a petroleum oil well is one of the most important stimulation techniques for improving oil production. Acidizing is used to enhance oil production by pumping high temperature acid into the wellbore in order create channels in rocks to allow for oil and gas to reach the well and to restore/maximize productivity of old/aging wells by dissolving rubble and repairing damage found in the old or aging wells. Acids are also employed to remove muds in newly drilled wells before they are used for production. Many different acids are used in acidizing treatments depending on the nature of well and the intended treatment, some of which are, hydrochloric acid (HCl), hydrofluoric acid (HF), acetic acid ($CH_3COOH$), chloroacetic acid ($ClCH_3COOH$), formic acid (HCOOH) and sulfamic acid ($H_2NSO_3H$). See A. Singha, M. A. Quraishi, Acidizing corrosion inhibitors: A review, J. Mater. Environ. Sci. 6 (2015) 224-235—incorporated herein by reference in its entirety. However, HCl (5-28% w/w) is the most commonly used acid in acidizing treatment. The technique of acidizing exposes the oil well casing, which is usually made of carbon steel, to harsh corrosive environments.

The use of corrosion resistant materials, cathodic protection, coatings, and the addition of corrosion inhibitors are the four practical methods usually employed to control corrosion, with the use of corrosion inhibitors being the most widely used as it has proven to be the most practical, economical, and efficient method in protecting oil wells against corrosion. See D. Dwivedi, K. Lepková, T. Becker, Carbon steel corrosion: a review of key surface properties and characterization methods, RSC Adv. 7 (2017) 4580-4610—incorporated herein by reference in its entirety. Inhibitors are added to the acid solution during the acidizing process to reduce the aggressive attack of the acid on oil wells. The effective acidizing inhibitors that are usually found in commercial formulations are acetylenic alcohols, alkenyl phenones, aromatic aldehydes, nitrogen-containing heterocyclics, and condensation products of carbonyls and amines. See G. W. Poling, Infrared Studies of Protective Films Formed by Acetylenic Corrosion Inhibitors, J. Electrochem. Soc. 114 (1967); J. K. D. Neemla, R. C. Saxena, A. K. Agrawal, R. Krishna, Corrosion inhibitor studies on steels in hydrochloric acid, Corros. Prev. Control. 6 (1992) 69-73; W. Frenier, F. Growcock, V. Lopp, α-Alkenylphenones—A New Class of Acid Corrosion Inhibitors, CORROSION. 44 (1988) 590-598; M. A. Quraishi, D. Jamal, Dianils: New and Effective Corrosion Inhibitors for Oil-Well Steel (N-80) and Mild Steel in Boiling Hydrochloric Acid, CORROSION, 56 (2000) 156-160; T. K. Emranuzzaman, S. Vishwanatham, G. Udayabhanu, Synergistic effects of formaldehyde and alcoholic extract of plant leaves for protection of N80 steel in 15% HCl, Corros. Eng. Sci. Technol. 39 (2013) 327-332; A. R. S. Priya, V. S. Muralidharan, A. Subramania, Development of novel acidizing inhibitors for carbon steel corrosion in 15% boiling hydrochloric acid, CORROSION, 64 (2008) 541-552; and M. Yadav, S. Kumar, P. N. Yadav, Corrosion Inhibition of Tubing Steel during Acidizatiob of Oil and Gas Wells, J. Pet. Eng. 2013 (2013) 9 pages—each incorporated herein by reference in their entirety. These inhibitors are however, effective only at high concentrations, toxic and not environmentally benign. See D. D. N. Singh, A. K. Dey, Synergistic Effects of Inorganic and Organic Cations on Inhibitive Performance of Propargyl Alcohol on Steel Dissolution in Boiling Hydrochloric Acid Solution, CORROSION, 49 (1993) 594-600—incorporated herein by reference in its entirety. Therefore, the search for new, nontoxic, and environmentally friendly effective corrosion inhibitors continues.

Naturally occurring biological compounds have been considered as possible corrosion inhibitors, most of which are organic compounds containing hetero atoms such as nitrogen, sulfur, phosphorus and/or oxygen atoms. See F. Deflorian, I. Felhosi, Electrochemical Impedance Study of Environmentally Friendly Pigments in Organic Coatings, CORROSION 59 (2003) 112-120; S. M. Powell, H. N. McMurray, D. A. Worsley, Use of the Scanning Reference Electrode Technique for the Evaluation of Environmentally Friendly, Nonchromate Corrosion Inhibitors, CORROSION, 55 (1999) 1040-1051; M. A. Quraishi, D. Jamal, Technical Note: CAHMT?A New and Eco-Friendly Acidizing Corrosion Inhibitor, CORROSION, 56 (2000) 983-985; M. A. Migahed, M. Abd-El-Raouf, A. M. Al-Sabagh, H. M. Abd-El-Bary, Effectiveness of some non-ionic surfactants as corrosion inhibitors for carbon steel pipelines in oil fields, Electrochim. Acta. 50 (2005) 4683-4689; P. Bommersbach, C. Alemany-Dumont, J. P. Millet, B. Normand, Formation and behaviour study of an environment-friendly corrosion inhibitor by electrochemical methods, Electrochim. Acta. 51 (2005) 1076-1084; T. Zaiz, T. Lanez, Application of some ferrocene derivatives in the field of corrosion inhibition, J. Chem. Pharm. Res. 4 (2012) 2678-2680; G. Blustein, A. R. Di Sarli, J. A. Jaén, R. Romagnoli, B. Del Amo, Study of iron benzoate as a novel steel corrosion inhibitor pigment for protective paint films, Corros. Sci. 49 (2007) 4202-4231; A. Bouyanzer, B. Hammouti, L. Majidi, Pennyroyal oil from *Mentha pulegium* as corrosion inhibitor for steel in 1 M HCl, Mater. Lett. 60 (2006) 2840-2843; M. A. Deyab, Effect of cationic surfactant and inorganic anions on the electrochemical behavior of carbon steel in formation water, Corros. Sci. 49 (2007) 2315-2328; A. M. Alsabagh, M. A. Migahed, H. S. Awad, Reactivity of polyester aliphatic amine surfactants as corrosion inhibitors for carbon steel in formation water (deep well water), Corros. Sci. 48 (2006) 813-828—each incorporated herein by reference in their entirety.

Gelatin (FIG. 1) is a mixture of proteins and peptides which is produced by the partial hydrolysis of collagen extracted from the skin, bones, and connective tissues of animals such as domesticated cattle, chicken, pigs, and fish. See N. Devi, M. Sarmah, B. Khatun, T. K. Maji, Encapsulation of active ingredients in polysaccharide-protein complex coacervates, Adv. Colloid Interface Sci. 239 (2017) 136-145; and S. M. Powell, H. N. McMurray, D. A. Worsley, Use of the Scanning Reference Electrode Technique for the Evaluation of Environmentally Friendly, Nonchromate Corrosion Inhibitors, CORROSION, 55 (1999) 1040-1051—each incorporated herein by reference in their entirety. Gelatin typically contains many glycine residues (approximately 1 in every three residues), proline and 4-hydroxyl proline residues. See A. Duconseille, T. Astruc, N. Quintana, F. Meersman, V. Sante-Lhoutellier, Gelatin structure and composition linked to hard capsule dissolution: A review, Food Hydrocoll, 43 (2015) 360-376—incorporated herein by reference in its entirety. Gelatin has been used as green corrosion inhibitor for corrosion of aluminum copper alloy, alloy steel AISI 304, mild steel, aluminum, and aluminum silicon alloys in mild acids (e.g., 1 M HCl, orthophosphoric acid) and bases (0.1 M NaOH) as cleaning solutions, electropolishing applications, self-healing coatings, etc. See R. B. Patel, J. M. Pandya, K. E. Emtilal, Colloids as corrosion inhibitors for aluminium copper alloy in hydrochloric acid, Proc. Indian Natn. Sci. Acad. 47 A (1981) 555-561; A. Stankiewicz, Z. Jagoda, K. Zielińska, I. Szczygieł, Gelatin microgels as a potential corrosion inhibitor carriers for self-healing coatings: Preparation and codeposition, Mater. Corros. 66 (2015) 1391-1396; W. Goldfarb, Surface active properties of gelatin and their effect on the electropolishing and corrosion behavior of steel in orthophosphoric acid, Egypt. J. Pet. 25 (2016) 229-237; M. Abdallah, E. M. Kamar, A. Y. El-Etre, S. Eid, Gelatin as corrosion inhibitor for aluminum and aluminum silicon alloys in sodium hydroxide solutions, Prot. Met. Phys. Chem. Surfaces. 52 (2016) 140-148; A. Pal, S. Dey, D. Sukul, Effect of temperature on adsorption and corrosion inhibition characteristics of gelatin on mild steel in hydrochloric acid medium, Res. Chem. Intermed. 42 (2016) 4531-4549—each incorporated herein by reference in its entirety.

However, there have been no reports of using gelatin as a corrosion inhibitor in oil field acidizing corrosive environment, i.e., very high concentration of hydrochloric acids (15% HCl).

In view of the forgoing, there is a need for corrosion inhibitors compositions that can be used at low concentrations for preventing corrosion of metal in various oil and gas field environments, including high temperature and highly acidic conditions common to acid stimulation operations.

SUMMARY OF THE INVENTION

Accordingly, it is one object of the present invention to provide novel methods of inhibiting corrosion of metal during acid stimulation of an oil and gas well using acidic treatment fluids containing high concentrations of acids and gelatin as a corrosion inhibitor.

Thus, the present invention provides:

A method of inhibiting corrosion of metal during acid stimulation of an oil and gas well, involving treating the oil and gas well with an acidic treatment fluid comprising 10 to 28 wt. % of an acid, based on a total weight of the acidic treatment fluid, and a corrosion inhibitor composition comprising gelatin, wherein the gelatin is present in the acidic treatment fluid in a concentration of 0.1 to 10% by weight per total volume of the acidic treatment fluid.

In some embodiments, the gelatin is present in the acidic treatment fluid in a concentration of 0.5 to 2.5% by weight per total volume of the acidic treatment fluid.

In some embodiments, the gelatin is Type A gelatin derived from acid-cured porcine skin.

In some embodiments, the gelatin is Type B gelatin derived from lime-cured bovine skin.

In some embodiments, the gelatin is Type A or Type B gelatin derived from fish skin or fish scales.

In some embodiments, the gelatin has a Bloom number of 50 to less than 220.

In some embodiments, the gelatin has a Bloom number of 220 to 325.

In some embodiments, the gelatin has 78 to 80 millimoles of free carboxyl groups per 100 g of protein.

In some embodiments, the gelatin has 100 to 115 millimoles of free carboxyl groups per 100 g of protein.

In some embodiments, the corrosion inhibitor composition further comprises at least one intensifier selected from the group consisting of CuI, KI, and formic acid, and wherein the intensifier is present in the acidic treatment fluid in a concentration of 0.001 to 0.15% by weight per total volume of the acidic treatment fluid.

In some embodiments, the intensifier is KI.

In some embodiments, the corrosion inhibitor composition is substantially free of a cinnamaldehyde compound, an alkoxylated fatty amine, an imidazoline compound, and a carboxylic acid compound having 1 to 12 carbon atoms or an ester or salt thereof.

In some embodiments, the corrosion inhibitor composition consists of gelatin.

In some embodiments, the acidic treatment fluid is substantially free of a polysaccharide, a synthetic polymer, a quaternary ammonium surfactant, and an organic solvent.

In some embodiments, the acidic treatment fluid is an aqueous solution.

In some embodiments, the acid is HCl and wherein the acidic treatment fluid comprises 14 to 16 wt. % HCl.

In some embodiments, the oil and gas well is treated with the acidic treatment fluid at a temperature of 25 to 180° C.

In some embodiments, the metal is carbon steel.

In some embodiments, the method has a corrosion inhibition efficiency of 55 to 85%.

In some embodiments, the corrosion rate of the metal is from 12 to 36 mils penetration per year (mpy).

BRIEF DESCRIPTION OF THE DRAWINGS

The foregoing paragraphs have been provided by way of general introduction, and are not intended to limit the scope of the following claims. A more complete appreciation of the invention and many of the attendant advantages thereof will be readily obtained as the same becomes better understood by reference to the following detailed description when considered in connection with the accompanying drawings, wherein:

DETAILED DESCRIPTION OF THE INVENTION

Figure 1:
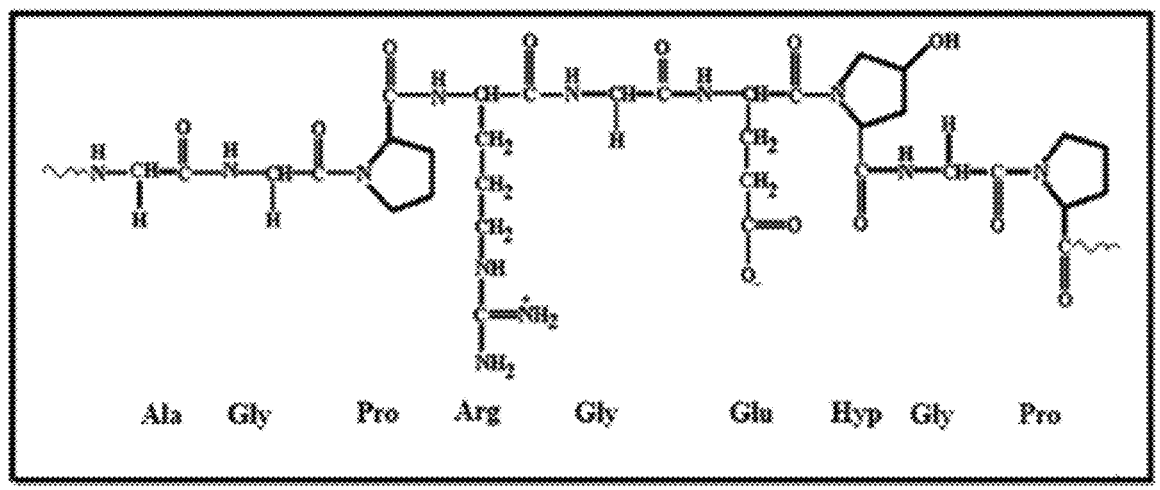
FIG. 1 illustrates the chemical structure of gelatin.

In the following description, it is understood that other embodiments may be utilized and structural and operational changes may be made without departure from the scope of the present embodiments disclosed herein.

Definitions

As used herein, the term "fatty" describes a compound with a long-chain (linear) hydrophobic portion made up of hydrogen and anywhere from 6 to 26, 8 to 24, 10 to 22, 12 to 20, 14 to 18 carbon atoms, which may be fully saturated or partially unsaturated, and optionally attached to a polar functional group such as a hydroxyl group, an amine group, or a carboxyl group (e.g., carboxylic acid). Fatty alcohols, fatty amines, fatty acids, fatty esters, and fatty amides are examples of materials which contain a fatty portion, and are thus considered "fatty" compounds herein. For example, stearic acid, which has 18 carbons total (a fatty portion with 17 carbon atoms and 1 carbon atom from the —COOH group), is considered to be a fatty acid having 18 carbon atoms herein.

As used herein, "alkoxylated" or "alkoxylate" refers to compounds containing a (poly)ether group (i.e., (poly)oxyalkylene group) derived from reaction with, oligomerization of, or polymerization of one or more alkylene oxides having 2 to 4 carbon atoms, and specifically includes (poly)oxyethylene (derived from ethylene oxide, EO), (poly)oxypropylene (derived from propylene oxide, PO), and (poly)oxybutylene (derived from butylene oxide, BO), as well as mixtures thereof.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic fragment having 1 to 26 carbon atoms, preferably 8 to 22, and more preferably 12 to 18. Non-limiting examples include, but are not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl), and unsaturated alkenyl and alkynyl variants such as vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, oleyl, linoleyl, and the like. Cycloalkyl is a type of cyclized alkyl group. Exemplary cycloalkyl groups include, but are not limited to, cyclopropyl, cyclobutyl, cyclopentyl, cyclohexyl, norbornyl, and adamantyl. The term "lower alkyl" is used herein to describe alkyl groups having 1 to 5 carbon atoms (e.g., methyl, ethyl, n-propyl, etc.).

As used herein, unless otherwise specified, the term "aryl" refers to an aromatic group containing only carbon in the aromatic ring(s), such as phenyl, biphenyl, naphthyl, anthracenyl, and the like. The term "heteroarene" or "heteroaryl" refers to an arene compound or aryl group where at least one carbon atom is replaced with a heteroatom (e.g., nitrogen, oxygen, sulfur) and includes, but is not limited to, pyridine, pyrimidine, quinoline, isoquinoline, pyrazine, pyridazine, indole, pyrrole, oxazole, furan, benzofuran, thiophene, benzothiophene, isoxazole, pyrazole, triazole, tetrazole, indazole, purine, carbazole, imidazole, and benzimidazole.

"Aroyl" refers to aryl carbonyl (arylC(O)—) substituents, such as benzoyl and naphthoyl while "alkanoyl" refers to alkyl variants (alkylC(O)—), where the alkyl group is bound to a carbon that is attached to an oxygen atom through a double bond. Examples of alkanoyl substitution includes, acetyl, propionyl, butyryl, isobutyryl, pivaloyl, valeryl, hexanoyl, octanoyl, lauroyl, and stearoyl. As used herein, "alkanoyloxy" groups are alkanoyl groups that are bound to oxygen (—O—C(O)-alkyl), for example, acetyloxy, propionyloxy, butyryloxy, isobutyryloxy, pivaloyloxy, valeryloxy, hexanoyloxy, octanoyloxy, lauroyloxy, and stearoyloxy. "Alkoxycarbonyl" substituents are alkoxy groups bound to C=O (e.g. —C(O)—Oalkyl), for example methyl ester, ethyl ester, and pivaloyl ester substitution where the carbonyl functionality is bound to the rest of the compound.

As used herein, "optionally substituted" means that at least one hydrogen atom is replaced with a non-hydrogen group, provided that normal valencies are maintained and that the substitution results in a stable compound. Such optional substituents may include, but are not limited to, aryl, alkoxy, aryloxy, arylalkyloxy, aroyl, alkanoyl, alkanoyloxy, carboxy, alkoxycarbonyl, hydroxy, halo (e.g. chlorine, bromine, fluorine or iodine), amino (e.g. alkylamino, arylamino, arylalkylamino, alkanoylamino, either mono- or disubstituted), oxo, amido (e.g. —CONH$_2$, —CONHalkyl, —CONHaryl, —CONHarylalkyl or cases where there are two substituents on one nitrogen), and the like.

As used herein the term "corrosion inhibitor" refers to a substance(s) that prevents or reduces the deterioration of a metal surface by oxidation or other chemical reaction. Corrosive substances that can cause corrosion, particularly of metal surfaces of equipment used during stimulation operations, include water with high salt contents, acidic inorganic compounds such as hydrochloric acid, hydrofluoric acid, carbon dioxide ($CO_2$) and/or hydrogen sulfide ($H_2S$), organic acids, and microorganisms. Preferred corrosion inhibitor compositions of the present invention reduce, inhibit and/or prevent the destructive effect such substances have on various metal surfaces.

As used herein, the phrase "acid stimulation" or "acidizing" refers to the general process of introducing an acidic fluid downhole to perform at least one of the following functions: (1) to react with and to dissolve the area surrounding the well which has been damaged; (2) to react with and to dissolve rock associated with the geological formation to create small conducting channels (e.g., conducting wormholes) through which the hydrocarbon will flow; and (3) to create a large flow channel by injecting acidic fluids through the well at pressures sufficient to fracture the rock, thus allowing the hydrocarbon to migrate rapidly from the rock to the well. Thus, "acid stimulation" or "acidizing" may refer to either or both matrix acidizing and fracture acidizing treatments.

Methods of Inhibiting Corrosion

Petroleum oil and natural gas wells are typically subjected to numerous chemical treatments during their production life to enhance operation and protect the integrity of the well and all related equipment. Acidic fluids (HCl, HF, etc.) are often used in stimulation operations such as in matrix acidizing and fracture acidizing treatments, where acidic fluids are injected into the well penetrating the rock pores to stimulate the well to improve flow or to remove damage. In matrix acidizing treatments, acidic treatment fluids are either injected into the well to react with and to dissolve the area surrounding the well to remove damage around the wellbore, or introduced into the subterranean formation under pressure (but below the fracture pressure) so that the acidic treatment fluids flow into the pore spaces of the formation and react with acid-soluble materials contained in the formation, resulting in an increase in the size of the pore spaces and an increase in the permeability of the formation. In fracture-acidizing treatments, the acidic treatment fluids are introduced above the fracture point of the formation to etch flow channels in the fracture face of the formation and to enlarge the pore spaces in the formation. The increase in formation permeability from these types of acidic treatments may increase the recovery of hydrocarbons from the formation. In most cases, acid stimulation procedures are carried out in calcareous formations such as dolomites, limestones, dolomitic sandstones, and the like.

A common problem associated with using acidic treatment fluids in subterranean formations is the corrosion of metal surfaces in piping, tubing, heat exchangers, reactors, downhole tools, and the other equipment which are exposed to such acid treatments. Further, other corrosive components such as brines, carbon dioxide, hydrogen sulfide, and microorganisms, may be entrained within the acidic stimulation fluids during stimulation, exacerbating the corrosion problem. Moreover, elevated temperatures are commonly encountered in deeper formations which increases the rate of corrosion. Corrosion issues are problematic for any drilling operation, but are even more troublesome in deep-sea operations where replacement of corroded equipment is difficult and costly.

Therefore, it is common practice to employ corrosion inhibitors during acid stimulation treatments of crude oil and natural gas wells. However, many corrosion inhibitors suffer from poor performance at low concentrations and particularly poor performance under high temperatures and under strongly acidic solutions, for example acidic solutions containing greater than or equal to 15 wt. % acid, necessitating the need for large quantities of corrosion inhibitors to be used. The use of large quantities of corrosion inhibitors is extremely undesirable when synthetic corrosion inhibitors are deployed in terms of both cost and from environmental concerns.

The present disclosure thus provides a method for inhibiting corrosion during acid stimulation in an oil and gas field using corrosion inhibitors obtained from natural sources. The methods involve treating or otherwise introducing an acidic treatment fluid containing an acid and a corrosion inhibitor composition comprising, consisting essentially of, or consisting of gelatin into an oil and gas well.

Acidic Treatment Fluid

The acidic treatment fluid of the present disclosure generally contains an acid and a corrosion inhibitor composition. The acidic treatment fluid may optionally include one or more of a surfactant, an organic solvent, and an additive.

Acid

The acid treatment fluid may contain a variety of acids, preferably water-soluble acids. Suitable acids include, but are not limited to, hydrochloric acid, formic acid, acetic acid, chloroacetic acid, hydrofluoric acid, sulfuric acid, sulfamic acid, as well as mixtures thereof, for example mud acid (mixtures of HCl and HF). In preferred embodiments, the acid is hydrochloric acid (HCl). Typically, the acidic treatment fluid contains 5 to 28 wt. % of the acid, preferably 7 to 24 wt. % of the acid, preferably 9 to 22 wt. % of the acid, preferably 10 to 20 wt. % of the acid, preferably 12 to 18 wt. % of the acid, preferably 14 to 16 wt. % of the acid(s) (e.g., HCl), based on a total weight of the acidic treatment fluid, although more concentrated (e.g., about 37 wt. %) or dilute versions may also be used in some circumstances. In some embodiments, the acidic treatment fluid has a pH of less than 3, preferably less than 2, preferably less than 1, preferably less than 0, for example from −2 to 0, or from −1 to 0.

In some embodiments, when the acidic treatment fluids are employed in the acid stimulation methods of the present disclosure, formation chemicals and fluids may become entrained therein. Therefore, in addition to the acid(s) listed above, the acidic treatment fluids may also contain other corrosive agents, including, but not limited to, carbon dioxide, corrosive sulfur species (e.g., hydrogen sulfide, mercaptans, etc.), brine, as well as mixtures thereof.

In preferred embodiments, the acidic treatment fluid is an aqueous solution, i.e., is substantially free of an oil phase. Preferably, the acidic treatment fluid is injected into the oil and gas well as an aqueous solution for acid stimulation operations, and in doing so, only minor amounts of produced oil and gas from the geological formation is entrained therein. However, the acidic treatment fluids may be effective for acid stimulation operations and simultaneously inhibiting corrosion of metal when in the form of multi-phase mixtures (e.g., water-oil mixtures and water-oil-gas mixtures), and emulsions. When in the form of multi-phase mixtures or emulsions, the acidic treatment fluid is preferably aqueous-based (in the case of emulsions, the aqueous phase is preferably the continuous phase).

Corrosion Inhibitor Compositions

The present disclosure provides corrosion inhibitor compositions that generally include gelatin and optionally one or more of an intensifier and a secondary corrosion inhibitor.

Gelatin

Gelatin (or gelatine) is a mixture of proteins and peptides (FIG. 1) which is produced by the partial hydrolysis (breakdown) of collagen extracted from the skin, bones, and/or connective tissues of animals such as domesticated cattle, chicken, pigs, and marine sources, in particular, bovine bones and hide, porcine skin, fish skin/scales, or fish offal. Gelatin is typically composed of approximately 86% protein, 12% moisture, and 2% ash (minerals) by weight, with the protein content being a heterogeneous mixture of water-soluble proteins of high molecular weight, typically containing many glycine residues (approximately 1 in every three residues), proline, and 4-hydroxyproline residues.

Broadly speaking, there are two types of gelatin, Type A gelatin and Type B gelatin, depending on the method of extraction, with each type having distinct structure and properties despite the fact they may be obtained from the exact same source. Type A gelatin is derived from acid-cured tissue and Type B gelatin is derived from lime-cured tissue.

In one illustrative example, Type A gelatin may be produced according to the following procedure (See U.S. Pat. No. 9,132,112B2; Sebastian, M. "Industrial Gelatin Manufacture—Theory and Practice" Academia, 2014—each incorporated herein by reference in its entirety). The animal skins (e.g., pigskins) may be dehaired and degreased and then passed through a chopper or macerator to cut the skin into uniform sizes. The skin may then be soaked/swelled at a pH of 1 to 4 with a food-grade mineral acid such as hydrochloric acid, phosphoric acid or sulfuric acid (e.g., 1 to 5% w/w acid solutions) for 8 to 30 hours, preferably 10 to 28 hours, preferably 12 to 26 hours, preferably 14 to 24 hours. The acid-treated skin (e.g., pigskin) may then be washed with water to remove impurities and extracted with hot water, usually in four to five extractions. The four to five extractions are typically made at temperatures increasing from 55 to 65° C. for the first extract to 95 to 100° C. for the last extract. Each extraction lasts about 4-8 hours. The extract may be degreased and filtered through an anion-cation exchange column to reduce ash or mineral levels. The gelatin extract may be vacuum concentrated or ultra-filtered to a concentration between 15 to 35%, preferably 20 to 30%, preferably 22 to 28%, preferably 24 to 26% by weight, filtered, and the pH may be adjusted to between 3.5 and 6, preferably between 4 and 5.5, preferably between 4.5 and 5, and evaporated to 40 to 60%, preferably about 50% solids by weight. The residue may be chilled, extruded, dried, and milled to a preferred particle size and then packaged. It is also known to pre-treat bovine ossein (de-mineralised bone) with acid prior to extraction of the gelatin although bovine ossein is more commonly pre-treated with alkali.

In another illustrative example, Type B gelatin may be produced according to the following procedure (See U.S. Pat. No. 9,132,112B2; Sebastian, M. "Industrial Gelatin Manufacture—Theory and Practice" Academia, 2014—each incorporated herein by reference in its entirety). Type B gelatin is made mostly from bovine bones, but may also be made from bovine hides and pork skins. The bones for type B gelatin may be crushed and optionally cooked, centrifuged and dried, and then degreased at a rendering facility. Rendered bone pieces, typically of 0.5 to 4 cm size and with less than 3%, preferably less than 2%, preferably less than 1% fat by weight, may be treated with cool, 4 to 7%, preferably 5 to 6% hydrochloric acid (w/w) for 4 to 14, preferably 5 to 12, preferably 6 to 10, preferably 7 to 8 days to remove the mineral content. The demineralized bones (i.e., ossein), may then be washed and transferred to large tanks where they are stored in a lime slurry, typically a 1 to 4%, preferably 2 to 3% lime (calcium hydroxide) slurry by weight, to adjust the pH to 10 to 13, or about 12. The ossein may be stored in such slurry tanks for 3 to 16 weeks, preferably 4 to 14 weeks, preferably 5 to 12 weeks, with daily agitation and weekly lime changes to remove non-collagen components. During the liming process, some deamination of the collagen may occur with evolution of ammonia (resulting in low isoelectric ranges for type B gelatin). After washing for 15 to 30 hours, preferably 18 to 28 hours, preferably 20 to 26 hours to remove the lime, the ossein may be acidified to pH 3 to 7, preferably 4 to 6, preferably about 5 with an appropriate acid. Then the extraction processing for Type A gelatin described above is commonly followed. While the above description relates to bovine bone, bovine hides and skins are also substantial sources of raw material for Type B gelatin and are supplied in the form of splits, trimmings of dehaired hide, rawhide pieces or salted hide pieces. Like pork skins, the hides are often cut to smaller pieces before being processed. The liming of hides usually takes a little longer than the liming of ossein from bone.

For marine (e.g., fish skin) processing to form Type A gelatin, the skins, scales, or offal of fish may be optionally pre-treated with dilute alkali for 18 to 24 hours, preferably 20 to 22 hours, and then washed and treated with dilute mineral acid, preferably sulfuric acid. The acid-treated material may then be optionally washed with water, treating with dilute aqueous organic acid, washed again with water, and extracted with water at elevated temperatures of 40 to 50°

C., but below 55° C., to yield the gelatin product (See GB 235,635; EP 0436266; U.S. Pat. No. 5,194,282—each incorporated herein by reference in its entirety). Another Type A gelatin-producing process is described EP1016347A1—incorporated herein by reference in its entirety, which involves washing the raw fish skins with water containing oxidizing agents, such as sodium hypochlorite or hydrogen peroxide, before extracting the washed and acid-treated skins at an acidic pH (no alkaline conditioning step is used in this process).

Type B gelatin from marine sources may be produced by the process described in U.S. Pat. No. 5,484,888—incorporated herein by reference in its entirety, in which fish skins are soaked in an alkaline solution for 60 days and then the excess alkali is removed before extracting the gelatin from an alkaline solution (see also WO2002094959A1—incorporated herein by reference in its entirety).

The content of amino acids found in gelatins varies depending on the animal source and the method of extraction, that is Type A versus Type B gelatin. For example, Table A below provides a comparison of the amino acid content of various gelatins obtained by complete hydrolysis, in grams of amino acid per 100 grams dry gelatin (GMIA 2019. Gelatin Handbook. Gelatin Manufactures Institute of America (USA: GMIA), pg. 1-27—incorporated herein by reference in its entirety).

TABLE A

Example amino acid composition of various gelatins

| | Type A (Porkskin) | | Type B (Calf Skin) | | Type B (Bone) | |
|---|---|---|---|---|---|---|
| Alanine | 8.6 | 10.7 | 9.3 | 11.0 | 10.1 | 14.2 |
| Arginine | 8.3 | 9.1 | 8.55 | 8.8 | 5.0 | 9.0 |
| Aspartic Acid | 6.2 | 6.7 | 6.6 | 6.9 | 4.6 | 6.7 |
| Cystine | 0.1 | | Trace | | Trace | |
| Glutamic Acid | 11.3 | 11.7 | 11.1 | 11.4 | 8.5 | 11.6 |
| Glycine | 26.4 | 30.5 | 26.9 | 27.5 | 24.5 | 28.8 |
| Histidine | 0.9 | 1.0 | 0.74 | 0.8 | 0.4 | 0.7 |
| Hydroxylysine | 1.0 | | 0.91 | 1.2 | 0.7 | 0.9 |
| Hydroxyproline | 13.5 | | 14.0 | 14.5 | 11.9 | 13.4 |
| Isoleucine | 1.4 | | 1.7 | 1.8 | 1.3 | 1.5 |
| Leucine | 3.1 | 3.3 | 3.1 | 3.4 | 2.8 | 3.5 |
| Lysine | 4.1 | 5.2 | 4.5 | 4.6 | 2.1 | 4.4 |
| Methionine | 0.8 | 0.9 | 0.8 | 0.9 | 0.0 | 0.6 |
| Phenylalanine | 2.1 | 2.6 | 2.2 | 2.5 | 1.3 | 2.5 |
| Proline | 16.2 | 18.0 | 14.8 | 16.4 | 13.5 | 15.5 |
| Serine | 2.9 | 4.1 | 3.2 | 4.2 | 3.4 | 3.8 |
| Threonine | 2.2 | | 2.2 | | 2.0 | 2.4 |
| Tyrosine | 0.4 | 0.9 | 0.2 | 1.0 | 0.0 | 0.2 |
| Valine | 2.5 | 2.8 | 2.6 | 3.4 | 2.4 | 3.0 |

The differences between Type A and Type B gelatin may also be measured according to carboxyl group content, with Type A gelatin typically having 78 to 80 millimoles of free carboxyl groups per 100 g of protein, and Type B gelatin typically having 100 to 115 millimoles of free carboxyl groups per 100 g of protein.

The different constitutional makeup (e.g., varying amino acid content) of gelatins depending on sources and processing types can impact the properties of the gelatin, for example, its propensity to gel, the gel strength (Bloom), the viscosity, and the isoelectric point, all of which may affect the gelatin's ability to adsorb onto metal surfaces for inhibiting corrosion.

The gelatin used in the present disclosure may be extracted from a number of sources of collagen, the most preferred being bovine bones and hide, porcine skin, or fish skin or scales. In preferred embodiments, the gelatin is derived from porcine skin or bovine skin. In some embodiments, the gelatin is derived from a mixture of collagen sources, for example, from a mixture of porcine and bovine collagen.

In some embodiments, the gelatin used herein is Type A gelatin, preferably Type A gelatin derived from acid-cured porcine skin. In some embodiments, the gelatin is Type B gelatin, preferably Type B gelatin derived from lime-cured bovine skin. In some embodiments, the gelatin is Type A gelatin derived from fish skin or fish scales. In some embodiments, the gelatin is Type B gelatin derived from fish skin or fish scales. In some embodiments, the gelatin used herein is a mixture of Type A and Type B gelatin.

In terms of its basic elements, the gelatin used in the disclosed methods is preferably composed of 49 to 52%, preferably 50 to 51%, preferably about 50.5% carbon; 5 to 8%, preferably 6 to 7%, preferably about 6.8% hydrogen; 15 to 19%, preferably 16 to 18, preferably about 17% nitrogen; and 24 to 27%, preferably 25 to 26%, preferably about 25.2% oxygen.

In some embodiments, the gelatin has 78 to 80, preferably 79 millimoles of free carboxyl groups per 100 g of protein. In some embodiments, the gelatin has 100 to 115, preferably 105 to 110, preferably about 108 millimoles of free carboxyl groups per 100 g of protein.

Gelatin has the ability to form thermo-reversible gels, and the gel strength of gelatin can be assessed using the Bloom gel strength test, which is a standard test procedure from the Gelatin Manufactures Institute of America (Standard Methods for the Sampling and Testing of Gelatins, Gelatin Manufacturers Institute of America, Inc., 1986, 501 fifth Ave. New York, NY, as well as The Association of Analytical Communities (AOAC) international, AOAC method 948.21 "Jelly Strength of Gelatin"—each incorporated herein by reference in its entirety). The Bloom number is the force (in grams) required to depress a standard AOAC plunger (12.7 mm diameter flat face cylindrical probe with a sharp edge) 4 mm into a set gelatin of 6.66% (w/v) concentration (e.g., 7.5 g gelatin in 105 mL of water) that has been kept at 10° C. for 16 hours. This gelling ability is related to both the average molecular weight of the gelatin and to the content of the hydroxyproline and proline amino acids in the collagen used. The gelatin of the present disclosure may be categorized according to the following Bloom number categories: <50 (very low bloom); 50 to <150 (low bloom); 150 to <220 (medium bloom); 220 to 325 (high bloom).

In some embodiments, the gelatin is a very low Bloom gelatin, having a Bloom number of less than 50, preferably less than 40, preferably less than 30, preferably less than 20. In some embodiments, the gelatin is a low Bloom gelatin, having a Bloom number of 50 to less than 150, preferably 75 to 125, preferably 90 to 110. In some embodiments, the gelatin is a medium Bloom gelatin, having a Bloom number of 150 to less than 220, preferably 160 to 210, preferably 175 to 200. In some embodiments, the gelatin is a high Bloom gelatin, having a Bloom number of 220 to 325, preferably 225 to 300, preferably 250 to 290, preferably 275 to 280.

The gelatin employed in the disclosed methods may have a viscosity between 1.5 to 7.89 mPas, preferably 2 to 7 mPas, preferably 2.5 to 6.5 mPas, preferably 3 to 6 mPas, preferably 3.5 to 5.5 mPas, preferably 4 to 5 mPas, preferably 4.3 to 4.7 mPas, as determined using the Gelatin Manufactures Institute of America standard procedure (Standard Methods for the Sampling and Testing of Gelatins, Gelatin Manufacturers Institute of America, Inc., 1986, 501 fifth Ave. New York, NY testing standard (6.66% w/v concentration at 60° C. using a calibrated glass capillary viscometer). In some embodiments, the gelatin is Type A gelatin with a viscosity of 2.7 to 4.2 mPas, preferably 3 to 4 mPas, preferably 3.2 to 3.8 mPas. In some embodiments, the gelatin is a Type B gelatin with a viscosity of 3.6 to 4.2 mPas, preferably 3.8 to 4.1 mPas, preferably 3.9 to 4 mPas. In some embodiments, the gelatin is a porcine skin gelatin or a grass carp gelatin with a viscosity of 7 to 7.89 mPas, preferably 7.07 to 7.8 mPas, preferably 7.2 to 7.6 mPas.

In some embodiments, the gelatin employed herein is a Type A gelatin having a pH as a 1.5% (w/v) solution at 25° C. of 3.8 to 5.5, preferably 4 to 5.2, preferably 4.2 to 5, preferably 4.4 to 4.8. In some embodiments, the gelatin employed herein is a Type B gelatin having a pH as a 1.5% (w/v) solution at 25° C. of 5 to 7.5, preferably 5.2 to 7, preferably 5.4 to 6.8, preferably 5.6 to 6.6.

Another property of gelatin that may influence its ability to adsorb onto metal surfaces and thus act as a corrosion inhibitor is its isoelectric point. The isoelectric point is the pH at which the gelatin molecule carries no net electrical charge or is electrically neutral in the statistical mean, and thereby shows no net migration on application of an electric field. In some embodiments, the gelatins of the present disclosure have an isoelectric point (pI) of 4.7 to 5.4, preferably 4.8 to 5.3, preferably 4.9 to 5.2, preferably 5 to 5.1, for example for Type B gelatins. In some embodiments, the gelatins of the present disclosure have an isoelectric point (pI) of 6.3 to 9.2, preferably 6.5 to 9, preferably 6.8 to 8.6, preferably 7 to 8.2, for example for Type A gelatins.

In addition to gelatins produced by the partial collagen hydrolysis methods described above (e.g., Type A and Type B gelatins), modified gelatins are also contemplated for use in the present disclosure. Acceptable examples of modified gelatins include, but are not limited to, enzyme modified gelatins such as gelatins treated with transglutaminase, polyphenol oxidases, and the like, to form cross-linked gelatins; (meth)acrylamide modified gelatins subject to radical cross-linking, such as those described in U.S. Pat. No. 6,458,386B1—incorporated herein by reference in its entirety; alkoxylated gelatins such as those described in U.S. Pat. No. 4,195,077A—incorporated herein by reference in its entirety; and recombinant gelatin such as the recombinant gelatins described in U.S. Pat. No. 7,393,928B2—incorporated herein by reference in its entirety.

Gelatin may be used in any amount sufficient to provide a desired anticorrosive effect. Typically, and in preferred embodiments, the gelatin is present in the acidic treatment fluid in a concentration of 0.01 to 10%, preferably 0.1 to 9.8%, preferably 0.2 to 9.5%, preferably 0.3 to 9%, preferably 0.4 to 8.5%, preferably 0.5 to 8%, preferably 0.8 to 7.5%, preferably 1 to 7%, preferably 1.2 to 6.5%, preferably 1.5 to 6%, preferably 1.8 to 5.5%, preferably 2.0 to 5%, preferably 2.5 to 4.5%, by weight per total volume of the acidic treatment fluid. Of course, gelatin dosages above or below these values may be used in some circumstances, when appropriate.

In some embodiments, the corrosion inhibitor composition consists of gelatin. In other words, gelatin may be the only corrosion inhibitor present in the acidic treatment fluid.

Intensifier

In some situations, for example, under particularly harsh conditions, the corrosion inhibitor compositions may optionally further include one or more intensifiers to further diminish the rate of corrosion. Suitable intensifiers may include, but are not limited to, carboxylic acid compounds having 1 to 12 carbon atoms or an ester (including protected carboxylic acid derivatives) or salt thereof, such as formic acid, acetic acid, oxalic acid, glycolic acid, propionic acids/esters/salts (e.g., propionic acid, 2-hydroxypropionic acid, 3-hydroxypropionic acid, 2-methoxypropionic acid, 3-methoxypropionic acid, 2-hydroxypropionic acid methyl ester, 3-hydroxypropionic acid methyl ester, 2-methoxypropionic acid methyl ester, 3-methoxypropionic acid methyl ester, sodium 2-hydroxypropionate, sodium 3-hydroxypropionate, sodium 2-methoxypropionate, and sodium 3-methoxypropionate), lactic acid, butanoic acid, isobutyric acid, pentanoic acid, arabinaric acid, glucaric acid, tartaric acid, 1,1-cyclobutanedicarboxylic acid, 2-(2-propynyl)malonic acid, 2,2-bis(hydroxymethyl)butanoic acid, 2,2-bis(hydroxymethyl)propionic acid, 2,2-diethylmalonic acid, 2,2-dihydroxymalonic acid hydrate, 2,2-dimethyl-1,3-dioxane-4,6-dione, 2,2-dimethylmalonic acid, 2-allylmalonic acid, 2-amino-2,4,5-trideoxypentonic acid, 2-butylmalonic acid, 2-ethylmalonic acid, 2-hydroxy-2-methylsuccinic acid, 2-isopropylmalonic acid, 2-methylmalonic acid, 2-methylserine, 3-(acryloyloxy)propanoic acid, 3-ethoxy-2-methyl-3-oxopropanoic acid, 3-ethoxypropanoic acid, 3-hydroxy-2-(hydroxymethyl)-2-methylpropanoic acid, 3-hydroxy-2,2-dimethylpropanoic acid, 3-hydroxy-2-oxopropanoic acid, 3-hydroxy-3-methylbutanoic acid, 3-hydroxybutanoic acid, 3-hydroxyproline, 3-methoxy-2-methyl-3-oxopropanoic acid, 3-methoxy-3-oxopropanoic acid, 3-methoxyalanine, 3-methoxybutanoic acid, 3-methoxypropanoic acid, 3-methoxyvaline, 4-amino-3-hydroxybutanoic acid, 4-hydroxy-4-methyltetrahydro-2H-pyran-2-one, 4-methyl-5-oxotetrahydro-3-furancarboxylic acid, diethyl malonate, dimethyl 2-ethylidenemalonate, dimethyl 2-methylmalonate, dimethyl malonate, disodium malonate, ethyl 3-ethoxypropanoate, ethyl 3-hydroxybutanoate, hydroxydihydro-2(3H)-furanone, lithium 3-hydroxy-2-oxopropanoate, malic acid, malonic acid, methyl 2-(1-hydroxyethyl)acrylate, methyl 2-amino-3-hydroxybutanoate, methyl 2-amino-3-hydroxypropanoate hydrochloride, methyl 2-oxo-2H-pyran-3-carboxylate, methyl 3,3-dimethoxypropanoate, methyl 3-hydroxy-2-(hydroxymethyl)-2-methylpropanoate, methyl 3-hydroxy-2,2-dimethylpropanoate, methyl 3-hydroxyhexanoate, methyl 3-methoxypropanoate, N-acetylserine, potassium 3-methoxy-3-oxopropanoate, serine, sodium 3-hydroxybutanoate, sodium malonate dibasic monohydrate, tartronic acid, and threonine, for example, those carboxylic acids/esters/salts/protected derivatives described in WO 2007007025 A1—incorporated herein by reference in its entirety;

formates such as $C_1$-$C_4$ alkyl formates (e.g., methyl formate and ethyl formate), aryl formates, and arylalkyl formates (e.g., benzyl formate);

formamides such as formamide, dimethyl formamide, 1,1'-azobisformamide;

metal halides such as sodium bromide, potassium bromide, sodium iodide, potassium iodide, copper(I) chloride, copper(I) iodide, copper(II) chloride, copper(II) iodide, antimony chloride;

as well as combinations thereof.

When employed, the intensifier is preferably at least one selected from the group consisting of CuI, KI, and formic acid, more preferably KI.

The intensifier may be pre-mixed with gelatin as part of the corrosion inhibitor composition, and may be introduced into the oil and gas well together in the acidic treatment fluid, or alternatively, the intensifier may be added to the oil and gas well as a separate component and the corrosion inhibitor composition may be formed downhole.

When employed, the intensifier may be present in a concentration of 0.001 to 3%, preferably 0.005 to 1%, preferably 0.01 to 0.5%, preferably 0.05 to 0.15%, preferably 0.08 to 0.1% by weight per total volume of the acidic treatment fluid.

In preferred embodiments, the corrosion inhibitor composition (and thus the acidic treatment fluid) is substantially free of an intensifier. In preferred embodiments, the corrosion inhibitor composition (and thus the acidic treatment fluid) is substantially free of a carboxylic acid compounds having 1 to 12 carbon atoms or an ester or salt or protected carboxylic acid derivative thereof, and metal halides (e.g., CuI, KI).

Secondary Corrosion Inhibitor

The corrosion inhibitor compositions may also optionally include one or more secondary corrosion inhibitors (in addition to gelatin). Suitable secondary corrosion inhibitors include, but are not limited to, a cinnamaldehyde compound, an alkoxylated fatty amine, and an imidazoline compound. When used, the secondary corrosion inhibitor may be present in amounts of 0.01 to 20%, preferably 0.05 to 15%, preferably 0.1 to 10%, preferably 0.5 to 5%, preferably 1 to 2% by weight per total volume of the acidic treatment fluid.

The cinnamaldehyde compound generally contains an optionally substituted aryl group separated from an aldehyde moiety (or a functional group mimic, protecting group, or isostere thereof) by one unsaturated carbon-carbon double bond or a two or more unsaturated carbon-carbon double bonds in conjugation (i.e., polyene moiety), the simplest of which is cinnamaldehyde (i.e., 3-phenyl-2-propen-1-al, $C_6H_5CH=CHCHO$), which may be obtained naturally from cinnamon oil. The aryl group may be unsubstituted (contain only hydrogen as is the case in cinnamaldehyde) or may be substituted with up to 5 substituents individually selected from the group consisting of an optionally substituted alkyl, an optionally substituted aryl, an optionally substituted alkoxy, an optionally substituted aroyl, an optionally substituted alkanoyl, an optionally substituted alkanoyloxy, a carboxy, an optionally substituted alkoxycarbonyl, a hydroxy, a halo, an amino group of the formula —$NH_2$, —$NHR_a$, or —$N(R_a)_2$, an alkyl ammonium salt of the formula —$(N(R_a)_3)^+$, a nitro, a cyano, a sulfate anion, an alkylsulfate, a thiocyano, an optionally substituted alkylthio, an optionally substituted alkylsulfonyl, an optionally substituted arylsulfonyl, or an optionally substituted sulfonamido (e.g., —$SO_2NH_2$), or wherein two adjacent substituents together form a methylene dioxy group. Examples of cinnamaldehyde compounds that can be used herein include, but are not limited to, cinnamaldehyde, 3,3'-(1,4-phenylene)diacrylaldehyde, p-hydroxycinnamaldehyde, p-methylcinnamaldehyde, p-ethylcinnamaldehyde, p-methoxycinnamaldehyde, 2,4,5-trimethoxycinnamaldehyde, 3,4,5-trimethoxycinnamaldehyde, 3,4-dimethoxycinnamaldehyde, 1-ethoxy-2-acetoxycinnamaldehyde, 1-ethoxy-2-hydroxycinnamaldehyde, sinapaldehyde, 2,5-dimethoxy-3,4-methylenedioxycinnamaldehyde, 2-methoxy-4,5-methylenedioxy cinnamaldehyde, coniferyl aldehyde, 2,3-dimethoxy-4,5-methylenedioxycinnamaldehyde, p-dimethylaminocinnamaldehyde, p-diethylaminocinnamaldehyde, p-nitrocinnamaldehyde, o-nitrocinnamaldehyde, 3,4-methylenedioxycinnamaldehyde, sodium p-sulfocinnamaldehyde, p-trimethylammoniumcinnamaldehyde sulfate, p-trimethylammoniumcinnamaldehyde o-methylsulfate, p-thiocyanocinnamaldehyde, p-chlorocinnamaldehyde, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, α-bromo-p-cyanocinnamaldehyde, α-ethyl-p-methylcinnamaldehyde, and p-methyl-α-pentylcinnamaldehyde, as well as mixtures thereof. Without being bound by theory, the cinnamaldehyde compound herein may inhibit corrosion caused by acidic mediums by undergoing an acid catalyzed polymerization reaction thereby forming a thin film on the metal surface being protected.

The corrosion inhibitor composition may optionally include an alkoxylated fatty amine. Fatty amines are compounds having a long-chain alkyl group made up of hydrogen and anywhere from 6 to 26 carbon atoms, preferably 8 to 22 carbon atoms, preferably 12 to 20 carbon atoms, more preferably 16 to 18 carbon atoms, bonded to an amine functional group. The fatty portion of the fatty amine may be saturated or may contain sites of unsaturation, for example, the fatty portion may be mono-, di-, tri-, oligo-, or poly-unsaturated. The fatty portion of the fatty amine preferably contains sites of unsaturation from the point of view of solubility. The site(s) of unsaturation may be cis-double bonds, trans-double bonds, or a combination. The fatty amines may be derivable from fatty acids, for example by subjecting a fatty acid, either a synthetic fatty acid or a naturally occurring fatty acid, to the Nitrile process followed by reduction (e.g., hydrogenation), which is known by those of ordinary skill in the art. Exemplary fatty acid starting materials that may be used to make the fatty amine include, for example, caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-inolenic acid, arachidonic acid, eicosapentaenoic acid, erucic acid, docosahexaenoic acid, and the like, as well as fatty acid mixtures (natural or synthetic mixtures) such as tall oil fatty acid and its derivatives (TOFA), coconut oil and its derivatives, tallow fatty acid and its derivatives (tallow), naphthenic acids and its derivatives, soya fatty acid and its derivatives (soya), and the like. Therefore, the fatty amines may also exist as a distribution or mixture of fatty amines when derived from mixtures of (naturally occurring) fatty acids. Exemplary fatty amines derivable or manufactured from fatty acids, include, but are not limited to, coco amine, stearyl amine, palmitoleylamine, oleylamine, tallow amine (e.g., Farmin TD, commercially available from Kao), tall oil fatty acid amine, laurylamine, linoleylamine, myristylamine, cetylamine, stearylamine, and soya amine, any of which may be optionally hydrogenated, partially hydrogenated, or non-hydrogenated.

The fatty amine may be a fatty monoamine, such as primary fatty amines (R—$NH_2$), and secondary di-fatty amines ($R_2$—NH), or fatty lower alkyl (e.g., methyl) amines (R—NH—$CH_3$); or a fatty (poly)alkylene polyamine, such as fatty ethylene diamines (R—NH—$(CH_2)_2$—$NH_2$), fatty ethylene triamines (linear or branched, R—NH—$(CH_2)_2$—NH—$(CH_2)_2$—$NH_2$), fatty ethylene tetramines (linear or branched, R—NH—$(CH_2)_2$—NH—$(CH_2)_2$—NH—$(CH_2)_2$—$NH_2$), fatty propylene diamines (R—NH—$(CH_2)_3$—$NH_2$), fatty propylene triamines (linear or branched, R—NH—$(CH_2)_3$—NH—$(CH_2)_3$—$NH_2$), and fatty propylene tetramines (linear or branched, R—NH—$(CH_2)_3$—NH—$(CH_2)_3$—NH—$(CH_2)_3$—$NH_2$). In preferred embodiments, R (above) is a mixture of long-chain alkyl groups derived from naturally occurring fatty acid mixtures such as tall oil fatty acid and its derivatives (TOFA), coconut oil and its derivatives, tallow fatty acid and its derivatives (tallow), naphthenic acids and its derivatives, soya fatty acid and its derivatives (soya), and the like.

Any of the aforementioned fatty amines may be alkoxylated to provide the alkoxylated fatty amines useful in the corrosion inhibitor compositions of the present disclosure. Primary fatty amines may be alkoxylated with one or two polyoxyalkylene ether groups (i.e., mono- or bis-alkoxylated), and secondary fatty amines may be alkoxylated with one polyoxyalkylene ether group (i.e., mono-alkoxylated). Suitable examples of alkoxylated fatty amines include, but are not limited to, a coconut amine alkoxylate, a stearyl amine alkoxylate, a palmitoleylamine alkoxylate, a oleylamine alkoxylate, a tallow amine alkoxylate, a tall oil amine alkoxylate, a laurylamine alkoxylate, a myristylamine alkoxylate, a cetylamine alkoxylate, a stearylamine alkoxylate, a linoleyl amine alkoxylate, a soya amine alkoxylate, as well as alkoxylated ethylene diamine variants thereof, alkoxylated trimethylene diamine variants thereof, alkoxylated diethylene triamine variants thereof, and alkoxylated dipropylene triamine variants thereof, preferably the alkoxylated fatty amine is an ethoxylated fatty amine.

Imidazoline compounds are those compounds which can be generally formed from a reaction between (i) a fatty acid or an ester derivative thereof, for example a $C_1$ to $C_{12}$ alkyl ester (e.g., methyl, ethyl, etc.) of a fatty acid or a glycerol ester of a fatty acid, and (ii) a polyamine which contains at least one ethylene diamine group (i.e., a polyamine containing at least one vicinal diamine). The imidazoline compound may be a non-ionic cyclization reaction product from reaction between (i) and (ii), or the imidazoline compound may be a modified imidazoline (cationic or amphoteric). Examples of cationic imidazolines include those non-ionic cyclization products which are further protonated by reaction with an acid or alkylated forming quaternary ammonium functional groups. Examples of amphoteric imidazolines include betaine-type imidazolines.

In some embodiments, the imidazoline compound is prepared from reaction between (i) tall oil fatty acid, coconut oil fatty acid, tallow fatty acid, soya fatty acid, and/or oleic acid. and (ii) any polyamine containing two, three, four, or more nitrogen groups, which may be primary, secondary, or tertiary amines, so long as at least one ethylene diamine group is present that is capable of reacting with a carboxylic acid group to form an imidazoline structure. Suitable polyamines include, but are not limited to, ethylene diamine, β-hydroxyethyl ethylene diamine, 1,2-diaminopropane, 1,2-diaminocyclohexane, 2,3-diaminobutane, 2,3-diaminobutan-1-ol, propane-1,2,3-triamine, tris(2-aminoethyl)amine, tetraethylenepentamine (TEPA), diethylenetriamine (DETA), triethylentetramine (TETA), aminoethylethanolamine (AEEA), pentaethylene hexamine (PEHA), and hexaethylene heptamine (HEHA).

A wide range of molar ratios of (i) and (ii) may be employed to form the imidazoline compounds herein, however, in preferred embodiments the molar ratio of (i) to (ii) is 1:5 to 5:1, preferably 1:1 to 5:1, more preferably 2:1 to 4:1, or any integers or non-integers in between. Imidazoline compounds that may be used in the corrosion inhibitor compositions herein may include, but is not limited to, 1:1 (molar ratio) TOFA/DETA imidazoline, 2:1 TOFA/DETA imidazoline, 1:1 TOFA/TETA imidazoline, 2:1 TOFA/TETA imidazoline, 2:1 TOFA/TETA bis-imidazoline, 1:1 TOFA/TEPA imidazoline, 2:1 TOFA/TEPA imidazoline, 2:1 TOFA/ TEPA bis-imidazoline, 3:1 TOFA/TEPA bis-imidazoline, 1:1 TOFA/AEEA imidazoline, 2:1 TOFA/AEEA imidazoline, 1:1 TOFA/polyamine imidazoline, 2:1 TOFA/polyamine imidazoline, 2:1 TOFA/polyamine bis-imidazoline, 3:1 TOFA/TEPA polyamine bis-imidazoline, 1:1 Soya/DETA imidazoline, 2:1 Soya/DETA imidazoline, 1:1 Soya/TETA imidazoline, 2:1 Soya/TETA imidazoline, 2:1 Soya/TETA bis-imidazoline, 1:1 Soya/TEPA imidazoline, 2:1 Soya/ TEPA imidazoline, 2:1 Soya/TEPA bis-imidazoline, 3:1 TOFA/TEPA bis-imidazoline, 1:1 Soya/AEEA imidazoline, 2:1 Soya/AEEA imidazoline, 1:1 Soya/polyamine imidazoline, 2:1 Soya/polyamine imidazoline, 2:1 Soya/polyamine bis-imidazoline, 1:1 Tallow/DETA imidazoline, 2:1 Tallow/ DETA imidazoline, 1:1 Tallow/TETA imidazoline, 2:1 Tallow/TETA imidazoline, 2:1 Tallow/TETA bis-imidazoline, 1:1 Tallow/TEPA imidazoline, 2:1 Tallow/TEPA imidazoline, 2:1 Tallow/TEPA bis-imidazoline, 3:1 Tallow/TEPA bis-imidazoline, 1:1 Tallow/AEEA imidazoline, 2:1 Tallow/ AEEA imidazoline, 1:1 Tallow/polyamine imidazoline, 2:1 Tallow/polyamine imidazoline, 2:1 Tallow/polyamine bis-imidazoline, 3:1 Tallow/TEPA polyamine bis-imidazoline, as well as mixtures thereof. Most preferably, when present, the imidazoline is 1:1 TOFA-DETA imidazoline or 1:1 TOFA-AEEA.

Other secondary corrosion inhibitors which may be optionally included in the corrosion inhibitor compositions include, but are not limited to, chromates, zinc salts, (poly) phosphates, organic phosphorus compounds (phosphonates), acetylenic alcohols (e.g., propargylic alcohol, pent-4-yn-1-ol, hexynol, ethyl octynol, octynol, 3-phenyl-2-propyn-1-ol), α,β-unsaturated aldehydes (other than cinnamaldehydes) (e.g., crotonaldehyde), aromatic aldehydes (e.g., furfural, p-anisaldehyde), phenones including alkenyl phenone (e.g., β-hydroxypropiophenone, phenyl vinyl ketone), nitrogen-containing heterocycles (e.g., piperazine, hexamethylene tetramine), quaternized heteroarenes (e.g., 1-(benzyl)quinolinium chloride), condensation products of carbonyls and amines (e.g., Schiff base), and other polymers obtained from natural sources (e.g., chitin, collagen, pectin, plant gums such as gum Arabic and guar gum, etc.).

In preferred embodiments, the corrosion inhibitor composition (and thus the acidic treatment fluid) is substantially free of secondary corrosion inhibitors. In preferred embodiments, the corrosion inhibitor composition (and thus the acidic treatment fluid) is substantially free of a cinnamaldehyde compound, an alkoxylated fatty amine, and an imidazoline compound.

Surfactant

The acidic treatment fluid may also optionally include one or more surfactants. The surfactant(s), when present, may be included in an amount of 0.01 to 10%, preferably 0.1 to 8%, preferably 0.5 to 6%, preferably 1 to 4% by weight per total volume of the acidic treatment fluid. Cationic, non-ionic, and/or amphoteric surfactants may be employed herein.

Cationic surfactants may include, but are not limited to
a protonated amine formed from a reaction between a $C_6$-$C_{26}$ alkyl amine compound and an acid (e.g., acetic acid, formic acid, propionic acid, butyric acid, pentanoic acid, hexanoic acid, oxalic acid, malonic acid, lactic acid, glyceric acid, glycolic acid, malic acid, citric acid, benzoic acid, p-toluenesulfonic acid, trifluoromethanesulfonic acid, hydrochloric acid, nitric acid, phosphoric acid, sulfuric acid, hydrobromic acid, perchloric acid, hydroiodic acid, etc.), such as protonated salts of $C_6$-$C_{26}$ alkyl monoamines, $C_6$-$C_{26}$ alkyl (poly)alkylene polyamines, and alkoxylated fatty amines;

a protonated $C_6$-$C_{26}$ alkyl amidoamine formed from a reaction between a $C_6$-$C_{26}$ alkyl amidoamine compound and an acid (for example the acids listed above), such as protonated forms of the amide reaction product between any fatty acid previously listed (or ester derivative thereof) with a polyamine (e.g., putrescine, cadaverine, ethylene diamine, $N^1,N^1$-dimethylethane-1,2-diamine, $N^1,N^1$-dimethylpropane-1,3-diamine, $N^1,N^1$-diethylethane-1,2-diamine, $N^1,N^1$-diethylpropane-1,3-diamine, spermidine, 1,1,1-tris(aminomethyl) ethane, tris(2-aminoethyl)amine, spermine, TEPA, DETA, TETA, AEEA, PEHA, HEHA, dipropylene triamine, tripropylene tetramine, tetrapropylene pentamine, pentapropylene hexamine, hexapropylene heptamine, dibutylene triamine, tributylene tetramine, tetrabutylene pentamine, pentabutylene hexamine, hexabutylene heptamine), with specific mention being made to protonated forms of stearamidopropyldimethylamine, stearamidopropyldiethylamine, stearamidoethyldiethylamine, stearamidoethyldimethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylmine, behenamidoethyldiethylamine, behenamidoethyldimethylamine, arachidamidopropyldimethylamine, arachidamidopropyldiethylamine, arachidamidoethyldiethylamine, and arachidamidoethyldimethylamine; and a quaternary ammonium compound made from alkylation with suitable alkylating agents (e.g., dimethyl sulfate, methyl chloride or bromide, benzyl chloride or bromide, $C_6$-$C_{26}$ alkyl chloride or bromide, etc.) of a tertiary $C_6$-$C_{26}$ alkyl amine, an alkoxylated (tertiary) amine, or an aprotic nitrogenous heteroarene (optionally substituted) having at least one aromatic nitrogen atom with a reactive lone pair of electrons, with specific mention being made to a $C_{10}$-$C_{18}$ alkyl trimethyl ammonium chloride or methosulfate, a di-$C_{10}$-$C_{18}$ alkyl dimethyl ammonium chloride or methesulfate, a $C_{10}$-$C_{18}$ alkyl benzyl dimethyl ammonium chloride, a methyl quaternized $C_6$-$C_{22}$ alkyl propylene diamine, a methyl quaternized $C_6$-$C_{22}$ alkyl propylene triamine, a methyl quaternized $C_6$-$C_{22}$ alkyl propylene tetraamine, a N—$C_{10}$-$C_{18}$ alkyl pyridinium or a quinolinium bromide or chloride such as N-octyl pyridinium bromide, N-nonyl pyridinium bromide, N-decyl pyridinium bromide, N-dodecyl pyridinium bromide, N-tetradecyl pyridinium bromide, N-dodecyl pyridinium chloride, N-cyclohexyl pyridinium bromide, naphthyl methyl quinolinium chloride, naphthyl methyl pyridinium chloride, and cetylpyridinium chloride, as well as mixtures thereof.

Non-ionic surfactants may include, but are not limited to:

alkanolamides of fatty acids, that is, amide reaction products between a fatty acid and an alkanolamine compound, such as coconut fatty acid monoethanolamide (e.g., N-methyl coco fatty ethanol amide), coconut fatty acid diethanolamide, oleic acid diethanolamide, and vegetable oil fatty acid diethanolamide;

alkoxylated alkanolamides of fatty acids, preferably ethoxylated and/or propoxylated variants of the alkanolamides of fatty acids using for example anywhere from 2 to 30 EO and/or PO molar equivalents, preferably 3 to 15 EO and/or PO molar equivalents, preferably 4 to 10 EO and/or PO molar equivalents, preferably 5 to 8 EO and/or PO molar equivalents per moles of the alkanolamide of the fatty acid (e.g., coconut fatty acid monoethanolamide with 4 moles of ethylene oxide);

amine oxides, such as N-cocoamidopropyl dimethyl amine oxide and dimethyl $C_6$-$C_{22}$ alkyl amine oxide (e.g., dimethyl coco amine oxide);

fatty esters, such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters;

ethers, such as (i) alkoxylated $C_1$-$C_{22}$ alkanols, which may include alkoxylated $C_1$-$C_5$ alkanols, preferably ethoxylated or propoxylated $C_1$-$C_5$ alkanols (e.g., dipropylene glycol n-butyl ether, tripropylene glycol n-butyl ether, dipropylene glycol methyl ether, tripropylene glycol methyl ether, diethylene glycol n-butyl ether, triethylene glycol n-butyl ether, diethylene glycol methyl ether, triethylene glycol methyl ether) and alkoxylated $C_6$-$C_{26}$ alkanols (including alkoxylated fatty alcohols), preferably alkoxylated $C_7$-$C_{22}$ alkanols, more preferably alkoxylated $C_8$-$C_{14}$ alkanols, preferably ethoxylated or propoxylated (e.g., cetyl stearyl alcohol with 2 to 40 moles of ethylene oxide, lauric alcohol with 2 to 40 moles of ethylene oxide, oleic alcohol with 2 to 40 moles of ethylene oxide, ethoxylated lanoline derivatives, laureth-3, ceteareth-6, ceteareth-11, ceteareth-15, ceteareth-16, ceteareth-17, ceteareth-18, ceteareth-20, ceteareth-23, ceteareth-25, ceteareth-27, ceteareth-28, ceteareth-30, isoceteth-20, laureth-9/myreth-9, and PPG-3 caprylyl ether); (ii) alkoxylated polysiloxanes; (iii) ethylene oxide/propylene oxide copolymers (e.g., PPG-1-PEG-9-lauryl glycol ether, PPG-12-buteth-16, PPG-3-buteth-5, PPG-5-buteth-7, PPG-7-buteth-10, PPG-9-buteth-12, PPG-12-buteth-16, PPG-15-buteth-20, PPG-20-buteth-30, PPG-28-buteth-35, and PPG-33-buteth-45); and (iv) alkoxylated alkylphenols.

Amphoteric surfactants may also be incorporated into the corrosion inhibitor compositions, and may include betaine-type compounds such as:

$C_6$-$C_{22}$ alkyl dialkyl betaines, such as fatty dimethyl betaines (R—N(CH$_3$)$_2$($^+$)—CH$_2$COO$^-$), obtained from a $C_6$-$C_{22}$ alkyl dimethyl amine which is reacted with a monohaloacetate salt (e.g., sodium monochloroacetate), such as $C_{12}$-$C_{14}$ dimethyl betaine (carboxylate methyl $C_{12}$-$C_{14}$ alkyl dimethylammonium);

$C_6$-$C_{22}$ alkyl amido betaines (R—CO—NH—CH$_2$CH$_2$CH$_2$—N(CH$_3$)$_2$($^+$)—CH$_2$COO$^-$ or R—CO—NH—CH$_2$CH$_2$—N(CH$_3$)$_2$($^+$)—CH$_2$COO$^-$), obtained by the reaction of a monohaloacetate salt (e.g., sodium monochloroacetate) with the reaction product of either dimethyl amino propylamine or dimethyl amino ethylamine with a suitable carboxylic acid or ester derivatives thereof, such as $C_{10}$-$C_{18}$ amidopropyl dimethylamino betaine;

$C_6$-$C_{22}$ alkyl sultaines or $C_6$-$C_{22}$ alkyl amido sultaines, which are similar to those $C_6$-$C_{22}$ alkyl dialkyl betaines or $C_6$-$C_{22}$ alkyl amido betaines described above except in which the carboxylic group has been substituted by a sulfonic group (R—N(CH$_3$)$_2$($^+$)—CH$_2$CH$_2$CH$_2$SO$_3^-$ or R—CO—NH—CH$_2$CH$_2$CH$_2$—N(CH$_3$)$_2$($^+$)—CH$_2$CH$_2$CH$_2$SO$_3^-$ or R—CO—NH—CH$_2$CH$_2$—N(CH$_3$)$_2$($^+$)—CH$_2$CH$_2$CH$_2$SO$_3^-$) or a hydroxysulfonic group (R—N(CH$_3$)$_2$($^+$)—CH$_2$CH(OH)—CH$_2$SO$_3^-$ or R—CO—NH—CH$_2$CH$_2$CH$_2$—N(CH$_3$)$_2$($^+$)—CH$_2$CH(OH)—CH$_2$SO$_3^-$ or R—CO—NH—CH$_2$CH$_2$—N(CH$_3$)$_2$($^+$)—CH$_2$CH(OH)—CH$_2$SO$_3^-$), such as C$_{10}$-C$_{18}$ dimethyl hydroxysultaine and C$_{10}$-C$_{18}$ amido propyl dimethylamino hydroxysultaine.

Organic Solvent

The base solvent of the acidic treatment fluid is preferably water. However, the acidic treatment fluid may also optionally include one or more organic solvents, which may aid solvation of the various ingredients as well as facilitate transfer of the active ingredients to the appropriate location within the wellbore or geological formation. In preferred embodiments, organic solvent(s) may be added in amounts of 1 to 50%, preferably 2 to 40%, preferably 3 to 30%, preferably 5 to 20%, preferably 10 to 18%, preferably 15 to 16% by weight per total volume of the acidic treatment fluid. The organic solvent may be at least one selected from the group consisting of a polar aprotic solvent, an aromatic solvent, a terpineol, a mono alcohol with 1 to 12 carbon atoms, and a polyol with 2 to 18 carbon atoms. Acceptable organic solvents include, but are not limited to, formamide, dimethyl formamide, dimethyl acetamide, methanol, ethanol, propanol, isopropanol, n-butanol, isobutanol, n-pentanol, n-hexanol, terpineol, menthol, prenol, 3-methyl-3-buten-1-ol, 2-ethyl-1-hexanol, 2-ethyl-1-butanol, 2-propylheptan-1-ol, 2-butyl-1-octanol, ethylene glycol, diethylene glycol, triethylene glycol, tetraethylene glycol, ethylene glycol methyl ether, ethylene glycol ethyl ether, ethylene glycol propyl ether, ethylene glycol butyl ether, diethylene glycol monomethyl ether, diethylene glycol monoethyl ether, propylene glycol, dipropylene glycol, propylene glycol monomethyl ether, pyrocatechol (1,2-benzenediol), resorcinol (1,3-benzenediol), phenol, cresol, benzyl alcohol, 1,3-propanediol, 1,3-butanediol, 2-butoxyethanol, 1,4-butanediol, 1,6-hexanediol, glycerol, pentaerythritol, manitol, sorbitol, as well as mixtures thereof.

Additives

The acidic treatment fluids may optionally further include one or more additives to modify the properties or functions of the acidic treatment fluid, as needed. Typically, when present, the additive(s) may be incorporated in an amount of less than 10%, preferably less than 8%, preferably less than 6%, preferably less than 4%, preferably less than 2%, preferably less than 1%, preferably less than 0.5%, preferably less than 0.1% by weight per total volume of the acidic treatment fluid.

Additive(s) suitable for use in oil and gas well operations are known by those of ordinary skill in the art, and may include, but are not limited to, viscosity modifying agents e.g., bauxite, bentonite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, polysaccharide gelling agents (e.g., xanthan gum, scleroglucan, and diutan) as well as synthetic polymer gelling agents (e.g., polyacrylamides and co-polymers thereof, see U.S. Pat. No. 7,621,334—incorporated herein by reference in its entirety), psyllium husk powder, hydroxyethyl cellulose, carboxymethylcellulose, and polyanionic cellulose, poly(diallyl amine), diallyl ketone, diallyl amine, styryl sulfonate, vinyl lactam, laponite;

chelating agents e.g., ethylene diamine tetraacetic acid (EDTA), diethylene triamine pentaacetic acid (DPTA), hydroxyethylene diamine triacetic acid (HEDTA), ethylene diamine di-ortho-hydroxy-phenyl acetic acid (EDDHA), ethylene diamine di-ortho-hydroxy-para-methyl phenyl acetic acid (EDDHMA), ethylene diamine di-ortho-hydroxy-para-carboxy-phenyl acetic acid (EDDCHA);

stabilizing agents e.g., polypropylene glycol, polyethylene glycol, carboxymethyl cellulose, hydroxyethyl cellulose, polysiloxane polyalkyl polyether copolymers, acrylic copolymers, alkali metal alginates and other water soluble alginates, carboxyvinyl polymers, polyvinylpyrollidones, polyacrylates;

dispersing agents e.g., polymeric or co-polymeric compounds of polyacrylic acid, polyacrylic acid/maleic acid copolymers, styrene/maleic anhydride copolymers, polymethacrylic acid and polyaspartic acid;

scale inhibitors e.g., sodium hexametaphosphate, sodium tripolyphosphate, hydroxyethylidene diphosphonic acid, aminotris(methylenephosphonic acid (ATMP), vinyl sulfonic acid, allyl sulfonic acid, polycarboxylic acid polymers such as polymers containing 3-allyloxy-2-hydroxy-propionic acid monomers, sulfonated polymers such as vinyl monomers having a sulfonic acid group, polyacrylates and co-polymers thereof;

defoaming agents e.g., silicone oils, silicone oil emulsions, organic defoamers, emulsions of organic defoamers, silicone-organic emulsions, silicone-glycol compounds, silicone/silica adducts, emulsions of silicone/silica adducts;

emulsifiers such as a tallow amine, a ditallow amine, or combinations thereof, for example a 50% concentration of a mixture of tallow alkyl amine acetates, C16-C18 (CAS 61790-60) and ditallow alkyl amine acetates (CAS 71011-03-5) in a suitable solvent such as heavy aromatic naphtha and ethylene glycol;

as well as mixtures thereof.

In some embodiments, the acidic treatment fluid is substantially free of a surfactant. In some embodiments, the acidic treatment fluid is substantially free of an organic solvent. In some embodiments, the acidic treatment fluid is substantially free of an additive (e.g., viscosity modifying agents, chelating agents, stabilizing agents, dispersing agents, scale inhibitors, and/or defoaming agents). In preferred embodiments, the acidic treatment fluid is substantially free of a polysaccharide (e.g., xanthan gum, scleroglucan, and diutan), a synthetic polymer (e.g., polyacrylamides and co-polymers thereof), and a quaternary ammonium surfactant.

Oil and Gas Well

The corrosion inhibitor compositions of the present disclosure may be deployed during any upstream (exploration, field development, and production operations), midstream (transportation e.g., by pipeline, processing, storage, and distribution), or downstream (manufacturing, refining, wholesale) oil and gas process where metal corrosion is a concern. However, the corrosion inhibitor compositions are particularly effective at combating corrosion caused by concentrated acidic fluids, and thus are advantageously employed during upstream processes, more preferably during acid stimulation treatments where corrosion caused by highly acidic mediums is a primary concern, even more preferably during matrix acidizing treatments.

In some embodiments, the acidic treatment fluids may be injected down the annulus of a well and optionally flushed with solvent. In some embodiments, the acidic treatment fluid is pre-formed above well by combining the acid (aq.) and the corrosion inhibitor composition, and any optional components, followed by injecting the pre-formed acidic treatment fluid downhole for the acid stimulation operation. In some embodiments, the acid (aq.) and the corrosion inhibitor composition (and any optional components) are injected downhole as separate streams, combining downhole to form the acidic treatment fluid for acid stimulation. The corrosion inhibitor compositions may be injected before, after, or simultaneously with the acid (aq.) for use in the stimulation process. Injection may proceed through suitable injection lines to areas where acid stimulation treatment is desired or where corrosion can, or is likely to, occur through capillaries or umbilical lines (in many cases at the wellhead if suitable metallurgy is used downhole). Injection may be performed manually or it may be automatic, for example, by using chemical injection pumps. In some embodiments, the acidic treatment fluid may be stored in a chemical storage tank and a chemical injection pump associated therewith may be used to introduce the acidic treatment fluid into the desired location of the operation. In any of the above applications, the acidic treatment fluid or any of its components combinable downhole may be injected continuously and/or in batches. The chemical injection pump(s) can be automatically or manually controlled to inject any amount of the acidic treatment fluid needed for acidizing operations or any amount of the corrosion inhibitor composition suitable for inhibiting corrosion.

The acidic treatment fluids may be in contact with many different types of surfaces on tubing and field equipment that are susceptible to corrosion. Illustrative examples of which include, but are not limited to, separation vessels, dehydration units, gas lines, pipelines, cooling water systems, valves, spools, fittings (e.g., such as those that make up the well Christmas tree), treating tanks, storage tanks, coils of heat exchangers, fractionating columns, cracking units, pump parts (e.g., parts of beam pumps), and in particular downhole surfaces that are most likely to come into contact with the acidic treatment fluids during stimulation operations, such as those casings, liners, pipes, bars, pump parts such as sucker rods, electrical submersible pumps, screens, valves, fittings, and the like.

Any metal surface that may come into contact with the acidic treatment fluid may be protected by the corrosion inhibitor compositions of the present disclosure. Typical metals found in oil and gas field environments that may be protected include carbon steels (e.g., mild steels, high-tensile steels, higher-carbon steels), including American Petroleum Institute (API) carbon steels; high alloy steels including chrome steels, ferritic alloy steels, austenitic stainless steels, precipitation-hardened stainless steels high nickel content steels; galvanized steel, aluminum, aluminum alloys, copper, copper nickel alloys, copper zinc alloys, brass, ferritic alloy steels, and any combination thereof. Specific examples of typical oil field tubular steels include X60, J-55, N-80, L-80, P:105, P110, and high alloy chrome steels such as Cr-9, Cr-13, Cr-2205, Cr-2250, and the like. In preferred embodiments, the methods herein inhibit corrosion of API X60 carbon steel.

The corrosion inhibitor compositions disclosed herein perform surprisingly well to inhibit corrosion in highly acidic mediums (such as in the acidic treatment fluids) at temperatures even up to 180° C., for example at temperatures of 25 to 180° C., preferably 30 to 160° C., preferably 40 to 140° C., preferably 45 to 120° C.

Corrosion rate is the speed at which metals undergo deterioration within a particular environment. The rate may depend on environmental conditions and the condition or type of metal. Factors often used to calculate or determine corrosion rate include, but are not limited to, weight loss (reduction in weight of the metal during reference time), area (initial surface area of the metal), time (length of exposure time) and density of the metal. Corrosion rate may be measured according to the American Society for Testing and Materials (ASTM) standard weight loss (immersion) test (e.g., according to ASTM G31-72 and described in the Examples), and may be computed using millimeters per year (mm/y) or mils penetration per year (mpy). In some embodiments, the method provides a corrosion rate of 0.1 to 1.5 mm/y, preferably 0.2 to 1.2 mm/y, preferably 0.3 to 1.0 mm/y, preferably 0.35 to 0.95 mm/y, preferably 0.4 to 0.9 mm/y, preferably 0.45 to 0.85 mm/y, preferably 0.5 to 0.8 mm/y, preferably 0.55 to 0.75 mm/y. In some embodiments, the method provides a corrosion rate of 5 to 50 mpy, preferably 10 to 45 mpy, preferably 12 to 40 mpy, preferably 15 to 38 mpy, preferably 17 to 36 mpy, preferably 20 to 34 mpy, preferably 24 to 32 mpy, preferably 26 to 31 mpy.

Corrosion inhibition efficiencies (IE %) may be measured by comparing the corrosion rates obtained from acidic treatment fluids with and without corrosion inhibitors using weight loss (immersion) studies, electrochemical impedance spectroscopy (EIS), linear polarization resistance (LPR), potentiodynamic polarization (PDP), or other similar methods. In some embodiments, the method described herein achieves a corrosion inhibition efficiency of 45 to 92%, preferably 50 to 90%, preferably 52 to 89%, preferably 55 to 88%, preferably 58 to 85%, preferably 59 to 80%, preferably 60 to 75%.

Of course, the methods herein do not preclude introduction of other known chemical treatments into oil and gas field production and downstream transportation, distribution, and/or refining systems, and thus the acidic treatment fluids may be used in conjunction with other chemical treatments known to those of ordinary skill in the art, including, but not limited to, hydrate inhibitors, scale inhibitors, asphaltene inhibitors, paraffin inhibitors, $H_2S$ scavengers, $O_2$ scavengers, emulsion breakers, foamers and de-foamers, and water clarifiers.

The examples below are intended to further illustrate protocols for preparing and testing the acidic treatment fluids and are not intended to limit the scope of the claims.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Experimental Procedure
Materials and Chemicals

Purified gelatin was obtained from Sigma Aldrich (Product Number 48723, CAS 9000-70-8), the molecular weight of gelatin cannot be determined accurately due to the complexity of gelatin molecular structure; the concentration was expressed in terms of % weight by volume. HCl (Sigma Aldrich), Potassium Iodide (Sigma Aldrich) and API X60 carbon steel from a typical oil pipeline was taken as test specimens.

Preparation of Carbon Steel Specimens

Chemical compositions of the specimen utilized are illustrated in Table 1. The carbon steel specimen was mechanically cut into coupons with dimensions (3 cm×3 cm×1 cm) for weight loss measurements and cylindrical with a total surface area of 3.14 cm² for electrochemical measurements. Prior to the experiments the carbon steel coupons were wet polished with 120, 240, 320, 400, 600, and 800 grit silicon carbide paper, thoroughly rinsed with double distilled water to give a mirror-like surface. After polishing, the specimens were degreased with acetone in an ultrasonic bath for 10 min, dried and enclosed in sealed water-proof bags and stored in a moisture-free desiccator prior to use.

Preparation of Inhibitor Solutions

Analytical grade HCl (Sigma Aldrich) was diluted to 15% HCl solution using double distilled water. Five different concentrations (0.5%, 1.0%, 1.5%, 2.0% and 2.5%) of the gelatin inhibitor were separately prepared in 15% HCl solutions and used for the experiments.

Weight Loss Measurement

The weight loss (Immersion Test) measurement was carried out according to the American Society for Testing and Materials (ASTM) standard method. Pre-weighed carbon steel coupons were immersed in the acids solutions without and with the different concentrations of the gelatin inhibitor for 24 h interval maintained at room temperature. After completion the coupons were retrieved, washed in 1M HCl for 10 s, thoroughly washed with water, dried after rinsing in acetone and weighed to determine the weight loss. The experiments were carried out in duplicate but only the mean value of the weight losses (g) are reported and used for computation of the corrosion rate. The corrosion rates were calculated in mm/y and mpy using Eqs (1) and (2) respectively.

$$\text{Corrosion rate } (mm/\text{year}) = \frac{W \times 8.76 \times 10^4}{A \times T \times D} \quad (1)$$

$$\text{Corrosion rate } (mpy) = \frac{W \times 3.45 \times 10^6}{A \times T \times D} \quad (2)$$

where, W represents the mass loss in g, A is the surface area exposed in cm², T is the time of exposure in hours, and D is the density in g/cm³ (7.86 g/cm³ for mild steel).

TABLE 1

Chemical composition of the X60 carbon steel specimen used in the study.

| Element | Fe | Cr | C | Si | Mn | Cu | Ni | Mo | Al | Nb | V |
|---|---|---|---|---|---|---|---|---|---|---|---|
| Composition (wt %) | <96.2 | 0.121 | 0.125 | 0.52 | 1.830 | 0.296 | 0.091 | 0.079 | 0.043 | 0.053 | 0.078 |

The inhibition efficiency was calculated using the Eq. 3. The corrosion inhibitor efficiency is a measurement of the effectiveness of the corrosion inhibitor, and the value ranges between 0 and 100%.

$$\% IE = \frac{CR_o - CR_i}{CR_o} \times 100 \quad (3)$$

where, $CR_0$ is the corrosion rate of carbon steel in the absence of an inhibitor and $CR_i$ is the corrosion rate of carbon steel in the presence of inhibitor.

Electrochemical Measurements

The electrochemical measurements were performed by using three cell electrodes, connected to Gamry Potentiostat/Galvanostat (Model G-3000) instrument. The conventional three-electrode set up composed of a silver/silver chloride electrode (Ag/AgCl) as the reference electrode, graphite as the counter electrode and one of the different steel specimens as the working electrode. Three electrochemical techniques, namely potentiodynamic polarization (PDP), linear polarization resistance (LPR), and electrochemical impedance spectroscopy (EIS) were used to study the corrosion behavior of carbon steel in the absence and presence of different concentrations of gelatin in 15% HCl at 25° C.

Prior to each electrochemical measurement, the working electrode was immersed in the test solution for 1 h to attain steady state condition of open circuit potential (OCP). The EIS was conducted at a frequency of 100 kHz to 10 mHz and an amplitude of ±10 mV after the 3600 s open circuit potential. The voltage ranged from −0.25V to +0.25V vs. $E_{OC}$ at a scan rate of 0.2 mV/s was used for PDP measurements. LPR measurements were taken at $E_{corr}$±10 mV at a scan rate of 0.25 mV/s. Gamry EChem Analyst 5.5 software was used to do the electrochemical data analysis and curve fittings.

Characterization Techniques

SEM/EDX

The surface morphology of both inhibited and uninhibited specimens were studied using SEM with EDX to determine the elemental composition of the steel surface and the corrosion products in the inhibited and uninhibited specimens. The SEM/EDX characterizations were carried out on coupons immersed in 2.5% gelatin solution with and without added KI in the 15% HCl.

ATR-FTIR

The FTIR analysis of the pure gelatin and the corrosion product was performed using Shimadzu FTIR-8400S spectrophotometer. Analysis of the samples was performed scanning through 400-4000 cm−1 wave number range. ATR-FTIR was carried out on pure gelatin sample and carbon steel surfaces after 24 hours immersion in 15% HCl solution in the presence of 2.5% gelatin without and with the addition of 0.05% KI.

UV-Visible Spectroscopy

UV-Visible analysis was carried out using Jasco V-770 spectrophotometer in a range of 200-800 nm. The UV-Visible spectra were collected for solutions of the 2.5% gelatin in 15% HCl recorded prior to immersion of the carbon steel, and solutions of 2.5% gelatin in the 15% HCl and 2.5% gelatin+0.05% KI in the 15% HCl after 24 hours immersion of the carbon steel. The spectral profiles were then compared to predict whether a complex is formed with the metal surface.

Results and Discussion
Weight Loss Measurements

Figure 2:
FIG. 2 illustrates the X60 carbon steel coupons immediately after immersion in 15% HCl solution in the absence and presence of different concentrations of gelatin at 25° C.
Figure 3:
FIG. 3 illustrates the X60 carbon steel coupons after 24 h immersion in 15% HCl solution in absence and presence of different concentrations of gelatin at 25° C.

The corrosion parameters obtained by conducting weight loss measurements for the carbon steel in the absence and presence of different concentration of gelatine in 15% HCl at room temperature are tabulated in Table 2. The corrosion rate values decreased with the increase in the concentration of gelatin. It is apparent that the inhibition efficiency increased with the increase in inhibitor concentration. This behavior could be explained based on the strong interaction of the inhibitor molecules with the metal surface resulting in adsorption of the inhibitor molecules of the metal surface. The extent of adsorption increases with the increase in concentration of the inhibitor leading to increased inhibition efficiency. The maximum inhibition efficiency (70.42%) was observed for inhibitor concentration of 2.5% w/v. Inhibitor molecules generally suppress dissolution of the metal by forming protective film adsorbed on the metal surface, this blocks the corrosive species from reaching the metal surface. Hence, gelatin could provide good corrosion protection at 25° C. in 15% HCl acid up to the test duration of 24 h and shows high corrosion-inhibitor efficiency. FIGS. 2 and 3 show images of the coupons immersed in 200 ml of the different gelatin concentrations just after immersion and after 24 hours of immersion. It is worth noting that no visible pitting or localized corrosion was observed on any of the coupons after the tests using gelatin.

Synergistic Effect of Addition of KI

The addition of potassium iodide (KI) additive increases the corrosion efficiency of the gelatin inhibitor due to synergism. The effect KI and other additives claimed to be of beneficial action on corrosion inhibitors in acidizing environments has been investigated. See M. Finšgar, J. Jackson, Application of corrosion inhibitors for steels in acidic media for the oil and gas industry: A review, Corros. Sci. 86 (2014) 17-41—incorporated herein by reference in its entirety. The addition of KI in acidic media have been reported synergistically increase the corrosion inhibition efficiency of organic inhibitors. See A. Y. Musa, A. B. Mohamad, A. A. H. Kadhum, M. S. Takriff, L. T. Tien, Synergistic effect of potassium iodide with phthalazone on the corrosion inhibition of mild steel in 1.0 M HCl, Corros. Sci. 53 (2011) 3672-3677; K. Aramaki, N. Hackerman, Inhibition Mechanism of Medium-Sized Polymethylene-imine, J. Electrochem. Soc. Electrochem. Sci. 116 (1969) 568-574; and A. E.-A. S. Fouda, A. M. El-Azaly, Synergistic Effect of Potassium Iodide with Some Heterocyclic Compounds on the Corrosion Inhibition of 304 Stainless Steel in Hydrochloric Acid Solution, J. Bio-Tribo-Corrosion. 3 (2017) 1-10—each incorporated herein by reference in their entirety. The halide ions improve adsorption of the inhibitor cations via the formation of intermediate bridges between the positively charged metal surface and the positive end of the inhibitor molecule. The synergistic effect between the halide ions and the inhibitor molecules is said to results from an increased surface coverage which arise from the cation-anion pair interaction initiated by the specific adsorption of the halide ions onto the metal surface. See E. E. Oguzie, Y. Li, F. H. Wang, Corrosion inhibition and adsorption behavior of methionine on mild steel in sulfuric acid and synergistic effect of iodide ion, J. Colloid Interface Sci. 310 (2007) 90-98—incorporated herein by reference in its entirety. Synergism between corrosion inhibitors and KI has been expressed in terms of a synergism parameter (S) according to equation 4. See K. Aramaki, N. Hackerman, Inhibition Mechanism of Medium-Sized Polymethylene-imine, J. Electrochem. Soc. Electrochem. Sci. 116 (1969) 568-574; I. O. Arukalam, Durability and synergistic effects of KI on the acid corrosion inhibition of mild steel by hydroxypropyl methylcellulose, Carbohydr. Polym. 112 (2014) 291-299—each incorporated herein by reference in their entirety. If S approaches unity implies there are no interactions between KI and the inhibitor molecules, while S>1 implies a synergistic effect, that is there exist a cooperative co-adsorption and S<1 implies an antagonistic interaction, that is there exist a competitive co-adsorption between the inhibitor molecules and KI.

$$S = \frac{1 - [(\theta_1 + \theta_2) - (\theta_1 \theta_2)]}{1 - \theta'_{1+2}} \quad (4)$$

where $\theta_1$ is the surface coverage of (KI), $\theta_2$ is the surface coverage of gelatin and $\theta_{1+2}{}^1$ is the surface coverage of gelatin and KI mixture. See M. M. Solomon, H. Gerengi, T. Kaya, E. Kaya, S. A. Umoren, Synergistic inhibition of St37 steel corrosion in 15% H2SO4 solution by chitosan and iodide ion additives, Cellulose. 24 (2017) 931-950—incorporated herein by reference in its entirety. Surface coverage θ=(IE %/100). See M. M. Solomon, S. A. Umoren, Enhanced corrosion inhibition effect of polypropylene glycol in the presence of iodide ions at mild steel/sulphuric acid interface, J. Environ. Chem. Eng. 3 (2015) 1812-1826—incorporated herein by reference in its entirety.

The calculated synergism parameters are given in Table 2, as can be seen all values of S were less than unity implying an antagonistic interaction between the gelatin inhibitor and KI. The gelatin molecules and the KI species can be said to be competitively co-adsorbed on the metal surface. It was also observed that corrosion inhibition efficiency of the lowest gelatin concentration (0.5% w/v) increases from 55.87% to 78.87% and that of the highest gelatin concentration (2.5% w/v) increases from 70.42% to 84.51% on addition of very low concentration of iodide ions (Table 2).

TABLE 2

Weight loss results for X60 carbon steel in 15% HCl in the absence and presence of different concentrations of gelatin and with the addition of 0.05 w/v % KI at 25° C.

| Concn of gelatin (w/v %) | Weight loss (g) | Corrosion rate mpy | mm/y | Efficiency IE (%) | S |
|---|---|---|---|---|---|
| Blank | 0.1373 | 83.70 | 2.13 | — | — |
| 0.5 | 0.0606 | 36.94 | 0.94 | 55.87 | — |
| 1.0 | 0.0551 | 33.59 | 0.85 | 60.09 | — |
| 1.5 | 0.0507 | 30.91 | 0.78 | 63.38 | — |
| 2.0 | 0.0458 | 27.92 | 0.71 | 66.67 | — |
| 2.5 | 0.0409 | 24.93 | 0.63 | 70.42 | — |
| 0.05 KI | 0.0406 | 24.75 | 0.63 | 70.42 | — |
| 0.5 + KI | 0.0288 | 17.56 | 0.45 | 78.87 | 0.62 |
| 2.5 + KI | 0.0213 | 12.99 | 0.33 | 84.51 | 0.56 |

Electrochemical Measurements
Electrochemical Impedance Spectroscopy (EIS)

Figure 4A:
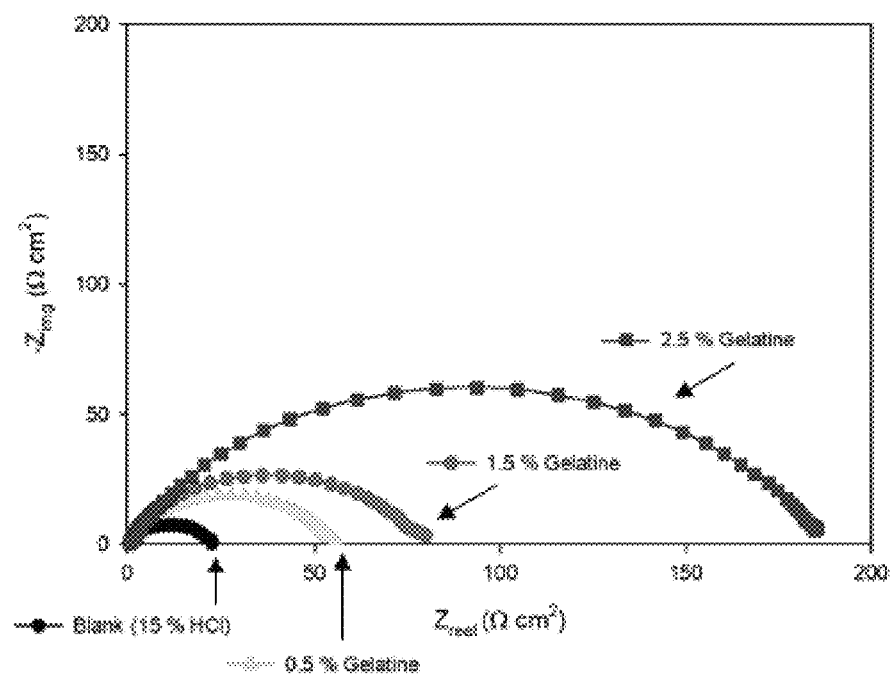
FIGS. 4A-4C are graphs illustrating (a) Nyquist, (b) Bode plots recorded for X60 carbon steel in 15% HCl solution in the absence and presence of different concentrations of gelatin at 25° C. and (c) equivalent circuit model used to fit the impedance plots.
Figure 4B:
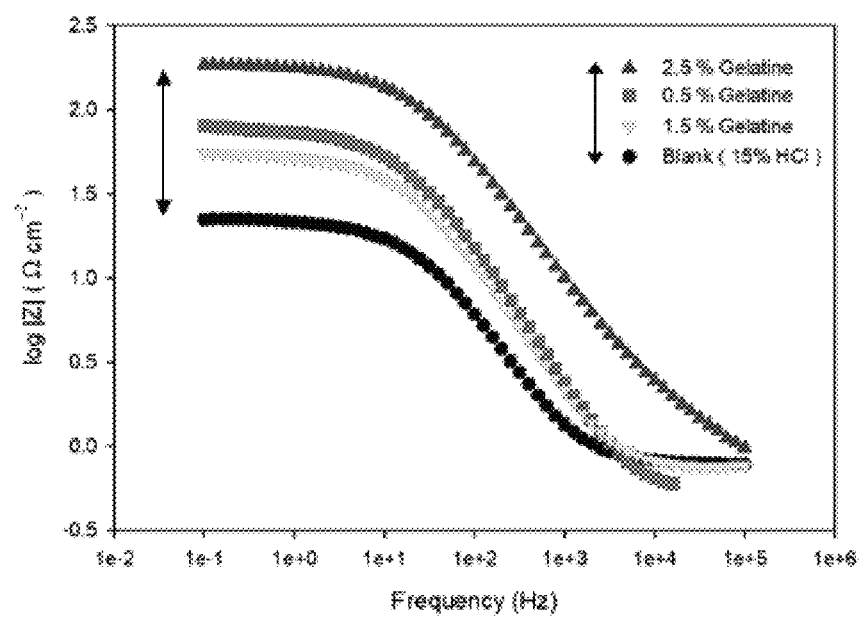
Figure 4C:
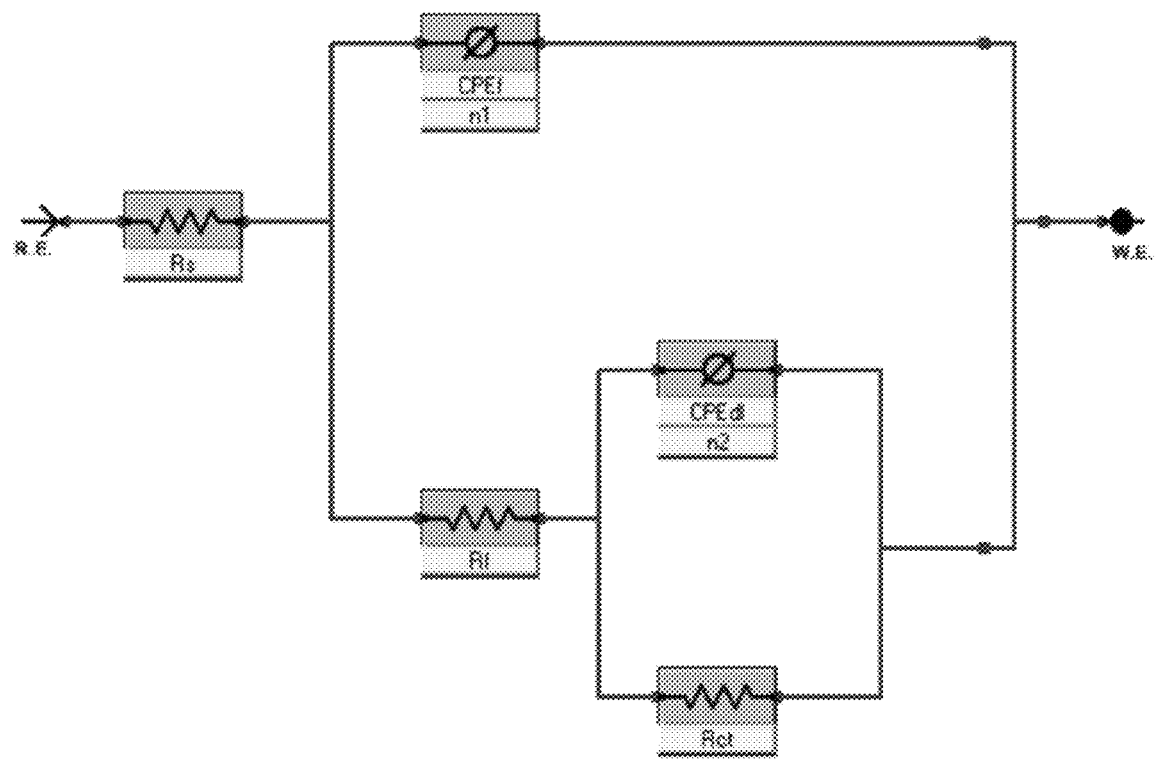

The inhibition performance of gelatine for carbon steel corrosion in 15% HCl solution was further investigated using EIS measurements. The Nyquist and Bode plots for the carbon steel (CS) in 15% HCl without and with various concentrations of gelatin are presented in FIGS. 4A and 4B respectively. The Nyquist plots are characterized by one capacitive semi-circular arc which corresponds to one time-constant in the Bode plots over the entire range of frequency. This shows that the corrosion mechanism is mainly controlled by charge transfer processes. See L. Guo, G. Ye, I. B. Obot, X. Li, X. Shen, W. Shi, X. Zheng, Synergistic Effect of Potassium Iodide with L-Tryptophane on the Corrosion Inhibition of Mild Steel: A Combined Electrochemical and Theoretical Study, Int. J. Electrochem. Sci. 12 (2017) 166-177—incorporated herein by reference in its entirety. The imperfect semi-circular nature of the capacitive arcs could be ascribed to surface inhomogeneities and roughness of coupons. The diameters of the Nyquist plots in the presence of various inhibitor concentrations were larger than that without inhibitor (blank). This implies that the inhibitor forms protective film on the surface of the metal thereby increasing the impedance of the metal surface to electrochemical corrosion. And this diameter increases with increasing the inhibitor concentration, an indication that the inhibition efficiency is in direct proportionality to the concentration. See P. Lowmunkhong, D. Ungthararak, P. Sutthivaiyakit, Tryptamine as a corrosion inhibitor of mild steel in hydrochloric acid solution, Corros. Sci. 52 (2010) 30-36; Y. Tang, X. Yang, W. Yang, Y. Chen, R. Wan, Experimental and molecular dynamics studies on corrosion inhibition of mild steel by 2-amino-5-phenyl-1,3,4-thiadiazole, Corros. Sci. 52 (2010) 242-249; and M. Prabakaran, S. H. Kim, V. Hemapriya, I. M. Chung, Tragia plukenetii extract as an eco-friendly inhibitor for mild steel corrosion in HCl 1 M acidic medium, Res. Chem. Intermed. 42 (2016) 3703-3719—each incorporated herein by reference in their entirety. The inhibitor formed the protective adsorbed layer on the metal surface by forming coordination bond between N atoms in the inhibitor and the metal surface. Increasing the concentration of the inhibitor increases the rate of interaction between the N-atoms in the gelatine and the metal at the active sites leading to more adsorption of the gelatin molecules on the metal surface. See K. Al Mamaril, H. Elmsellem, N. K. Sebbar, A. Elyoussfi, H. Steli, M. Ellouz, Y. Ouzidan, A. Nadeem, E. M. Essassi, F. El-Hajjaji, Electrochemical and theoretical quantum approaches on the inhibition of mild steel corrosion in HCl using synthesized benzothiazine compound J. Mater. Environ. Sci. 7 (2016) 3286-3299—incorporated herein by reference in its entirety. The inhibitor molecules suppress the dissolution of the carbon steel by forming inhibitor/metal complex. This complex adsorbed to the surface and effectively blocks it from the corrosive media. See S. Paramasivam, K. Kulanthai, G. Sadhasivam, R. Subramani, Corrosion Inhibition of Mild Steel in Hydrochloric Acid using 4-(pyridin-2yl)-Np-tolylpiperazine-1-carboxamide, Int. J. Electrochem. Sci. 11 (2016) 3393-3414—incorporated herein by reference in their entirety. The Bode impedance modulus plots show linear portions at intermediate frequencies. And this linearity at intermediate frequencies is more pronounced in the presence of the gelatine inhibitor signifying higher slopes than the blank solution. See S. Kumar, H. Vashisht, L. O. Olasunkanmi, I. Bahadur, H. Verma, G. Singh, I. B. Obot, E. E. Ebenso, Experimental and theoretical studies on inhibition of mild steel corrosion by some synthesized polyurethane tri-block co-polymers, Sci. Rep. 6 (2016) 1-18—incorporated herein by reference in its entirety. The linearity increases with increasing the gelatin concentration, indicating higher inhibition efficiency with increasing gelatin concentration. The equivalent circuit employed to fit the EIS spectra is shown in FIG. 4C. The accuracy of the fit was between $0.16 \times 10^{-4}$ and $1.5 \times 10^{-4}$ in all plots. The model utilized to fit the spectra includes $R_s$ (solution resistance between working and counter electrodes), $CPE_f$ (constant phase angle element of film), $R_f$ (film resistance), and $CPE_{dl}$ (double layer constant phase element) and $R_{ct}$ (charge transfer resistance). The calculated electrochemical parameters obtained from the fitting are presented in Table 3. The percentage inhibition efficiencies (% IE) were evaluated from equation 5:

$$IE(EIS) \% = \left(1 - \frac{R_P}{R_{PI}}\right) \times 100 \qquad (5)$$

where $R_p$ (sum of $R_{ct}$ and $R_f$) and $R_{PI}$ represent polarization resistances absence and presence of gelatin respectively.

Rather than behaving as a pure capacitor, the double layer formed by the adsorption of gelatin molecules on the metal surface behaves as constant phase element (CPE). To give a more accurate fit, constant phase element (CPE) was substituted for the capacitance element. See C. Verma, M. A. Quraishi, E. E. Ebenso, I. B. Obot, A. El Assyry, 3-Amino alkylated indoles as corrosion inhibitors for mild steel in 1M HCl: Experimental and theoretical studies, J. Mol. Liq. 219 (2016) 647-660; and A. Y. Adesina, Z. M. Gasem, A. Madhan Kumar, Corrosion Resistance Behavior of Single-Layer Cathodic Arc PVD Nitride-Base Coatings in 1M HCl and 3.5 pct NaCl Solutions, Metall. Mater. Trans. B Process Metall. Mater. Process. Sci. 48 (2017) 1321-1332—each incorporated herein by reference in their entirety. The impedance of the CPE is evaluated from equation 6:

$$Z_{CPE} = Y_o^{-1}(j\omega)^{-n} \qquad (6)$$

where $Y_o$ is the magnitude of CPE, j is the square root of $-1$, $\omega$ is angular frequency and n is phase shift. See M. Larif, A. Elmidaoui, A. Zarrouk, H. Zarrok, R. Salghi, B. Hammouti, H. Oudda, F. Bentiss, An investigation of carbon steel corrosion inhibition in hydrochloric acid medium by an environmentally friendly green inhibitor, Res. Chem. Intermed. 39 (2013) 2663-2677—incorporated herein by reference in its entirety.

TABLE 3

Impedance parameters for X60 carbon steel in 15% HCl in the absence and presence of different concentrations of gelatin at 25° C.

| | | CPE$_f$ | | | | CPE$_{dl}$ | | | | | | |
|---|---|---|---|---|---|---|---|---|---|---|---|---|
| Gelatin Conc. (w/v %) | $R_S$ ($\Omega$ cm$^2$) | $Y_{of}$ ($\mu\Omega$s$^n$ cm$^{-2}$) | $n_1$ | $R_f$ ($\Omega$ cm$^2$) | $Cdl_f$ ($\mu$F cm$^{-2}$) | $Y_{o2}$ ($\mu\Omega$s$^n$ cm$^{-2}$) | $n_2$ | $R_{ct}$ ($\Omega$ cm$^2$) | $R_p$ ($\Omega$ cm$^2$) | $C_{dl}$ ($\mu$F cm$^{-2}$) | $\chi^2 \times 10^{-3}$ | IE (%) |
| Blank | 0.80 | 212.70 | 0.96 | 1.40 | 172.11 | 1591.0 | 0.60 | 20.65 | 22.05 | 191.48 | 1.455 | — |
| 0.5 | 0.77 | 19.31 | 1.11 | 0.83 | 30.43 | 653.7 | 0.70 | 53.69 | 54.52 | 189.16 | 1.192 | 59.56 |

TABLE 3-continued

Impedance parameters for X60 carbon steel in 15% HCl in the absence and presence of different concentrations of gelatin at 25° C.

| Gelatin Conc. (w/v %) | $R_s$ ($\Omega$ cm$^2$) | CPE$_f$ | | | | CPE$_{dl}$ | | | | | | |
|---|---|---|---|---|---|---|---|---|---|---|---|---|
| | | $Y_{o1}$ ($\mu\Omega$s$^n$ cm$^{-2}$) | $n_1$ | $R_f$ ($\Omega$ cm$^2$) | Cdl$_f$ ($\mu$F cm$^{-2}$) | $Y_{o2}$ ($\mu\Omega$s$^n$ cm$^{-2}$) | $n_2$ | $R_{ct}$ ($\Omega$ cm$^2$) | $R_p$ ($\Omega$ cm$^2$) | $C_{dl}$ ($\mu$F cm$^{-2}$) | $\chi^2 \times 10^{-3}$ | IE (%) |
| 1.5 | 0.58 | 56.41 | 1.00 | 2.62 | 56.41 | 591.1 | 0.63 | 76.75 | 79.37 | 99.10 | 1.100 | 72.22 |
| 2.5 | 0.86 | 150.30 | 0.73 | 24.95 | 38.40 | 2.3 | 1.00 | 159.90 | 184.85 | 2.30 | 0.647 | 88.07 |

The double layer capacitances $C_{dl}$ were evaluated from equation 7:

$$C_{dl} = Y_o(\omega_{max})^{n-1} \qquad (7)$$

where $\omega_{max}=2\pi f_{max}$; $f_{max}$ is the frequency at which imaginary component of the impedance spectrum is maximum. See J. Chen, Y. Qiang, S. Peng, Z. Gong, S. Zhang, L. Gao, B. Tan, S. Chen, L. Guo, Experimental and computational investigations of 2-amino-6-bromobenzothiazole as a corrosion inhibitor for copper in sulfuric acid, J. Adhes. Sci. Technol. (2018) 1-16; and M. Mobin, S. Zehra, R. Aslam, L-Phenylalanine methyl ester hydrochloride as a green corrosion inhibitor for mild steel in hydrochloric acid solution and the effect of surfactant additive, RSC Adv. 6 (2016) 5890-5902—each incorporated herein by reference in their entirety.

A significant increase in the charge transfer resistance ($R_{ct}$) was observed in the presence of the inhibitor (Table 3). The $R_{ct}$ increases with increasing the concentration of the gelatin leading to the enhanced inhibitor efficiency. This behaviour is due to the formation of surface film on the metal surface by the inhibitor molecules. The surface film protects the carbon steel by isolating it from the corroding media thereby impeding further charge and mass transfer. As can be seen from Table 3, the $Y_{o2}$ and $C_{dl}$ values decreases with the increasing concentration of gelatin. This decrease in the concentration of $C_{dl}$ results from the decrease in local dielectric constant and/or an increase in the thickness of the electrical double layer, suggesting that gelatin molecule functions by adsorption at the metal/solution interface. See P. Roy, P. Karfa, U. Adhikari, D. Sukul, Corrosion inhibition of mild steel in acidic medium by polyacrylamide grafted Guar gum with various grafting percentage: Effect of intramolecular synergism, Corros. Sci. 88 (2014) 246-253; C. B. Verma, M. A. Quraishi, A. Singh, 2-Aminobenzene-1,3-dicarbonitriles as green corrosion inhibitor for mild steel in 1 M HCl: Electrochemical, thermodynamic, surface and quantum chemical investigation, J. Taiwan Inst. Chem. Eng. 49 (2015) 229-239—each incorporated herein by reference in their entirety.

Potentiodynamic Polarization Measurements

Figure 5:
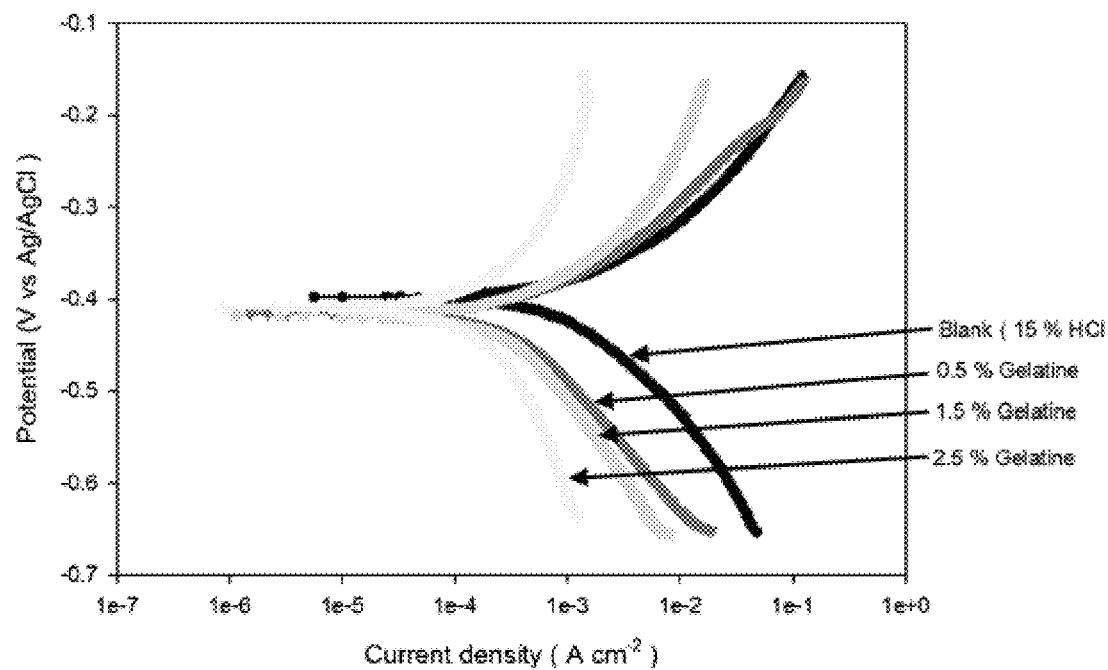
FIG. 5 is a graph illustrating the potentiodynamic polarization plots recorded for X60 carbon steel in 15% HCl in the absence and presence of different concentrations of gelatin at 25° C.

Potentiodynamic polarization study was carried out in absence and presence of different concentrations of gelatin to understand the effect of the gelatin inhibitor on the anodic oxidative metallic dissolution and cathodic reductive hydrogen evolution. FIG. 5 shows the potentiodynamic polarization curves for mild steel in absence and presence gelatin inhibitor. Inhibitor efficiency was evaluated from corrosion current densities utilizing equation (8).

$$IE(PDP) \% = \left(1 - \frac{I_{corr}^I}{I_{corr}^B}\right) \qquad (8)$$

where $I_{corr}^B$ is the corrosion current density in blank and $I_{corr}^I$ is corrosion current density with an inhibitor present.

The values electrochemical parameters, such as corrosion potential ($E_{corr}$), corrosion current density ($i_{corr}$), anodic and cathodic Tafel slopes ($\beta$a, $\beta$c) given in Table 4 were obtained by extrapolating Tafel slopes to $E_{corr}$. The corrosion current densities for both anodic and cathodic half reactions were significantly reduced in the presence of the gelatin inhibit as it can be seen in FIG. 5 and Table 4. This is an indication that the gelatin inhibitor successfully inhibited both the anodic dissolution of the carbon steel and cathodic evolution of hydrogen. See C. Zhang, H. Duan, J. Zhao, Synergistic inhibition effect of imidazoline derivative and L-cysteine on carbon steel corrosion in a CO2-saturated brine solution, Corros. Sci. 112 (2016) 160-169; J. Zhao, H. Duan, R. Jiang, Synergistic corrosion inhibition effect of quinoline quaternary ammonium salt and Gemini surfactant in H2S and CO2 saturated brine solution, Corros. Sci. 91 (2015) 108-119—each incorporated herein by reference in their entirety. No definitive trend in shift of $E_{corr}$ in the presence of the different gelatin concentration was observed, suggesting that gelatin is a mixed-type inhibitor. See M. A. Hegazy, M. Abdallah, H. Ahmed, Novel cationic gemini surfactants as corrosion inhibitors for carbon steel pipelines, Corros. Sci. 52 (2010) 2897-2904—incorporated herein by reference in its entirety. Though, the $E_{corr}$ tends towards more negative in the presence of gelatin and that the $\beta$c values were more affected as compare to the $\beta$a suggesting that the gelatin predominantly act as a cathodic type indicator. See C. Verma, M. A. Quraishi, L. O. Olasunkanmi, E. E. Ebenso, L-Proline-promoted synthesis of 2-amino-4-arylquinoline-3-carbonitriles as sustainable corrosion inhibitors for mild steel in 1 M HCl: Experimental and computational studies, RSC Adv. 5 (2015) 85417-85430—incorporated herein by reference in its entirety. A significant decrease in $I_{corr}$ values was observed in the presence of gelatin compared to the blank 15% HCl, and this decrease prevails with increasing gelatin concentration. Thus, gelatin reduces the corrosion rate of carbon steel. The decrease in values of $I_{corr}$ in presence of gelatin can be attributed to the blocking of the active sites present on the metallic surface. See F. Bentiss, M. Lebrini, H. Vezin, M. Lagrenée, Experimental and theoretical study of 3-pyridyl-substituted 1,2,4-thiadiazole and 1,3,4-thiadiazole as corrosion inhibitors of mild steel in acidic media, Mater. Chem. Phys. 87 (2004) 18-23—incorporated herein by reference in its entirety.

Linear Polarization Resistance (LPR) Measurement

Linear polarization resistance measurement was also employed to evaluate corrosion inhibition efficiency of gelatin for the carbon steel in 15% HCl. LPR is a nondestructive technique and allows for the measurement of corrosion rates in real time. To ensure accurate measurement and no significant or permanent disruption of the corrosion process, a sufficiently small polarization voltage value of 10 mV was chosen within which the linear relationship between E/I and Icorr holds. See L. O. Olasunkanmi, I. B. Obot, M. M. Kabanda, E. E. Ebenso, Some Quinoxalin-6-yl Derivatives as Corrosion Inhibitors for Mild Steel in Hydrochloric Acid: Experimental and Theoretical Studies, J. Phys. Chem. C. 119 (2015) 16004-16019; S. G. Millard, D. Law, J. H. Bungey, J. Cairns, Environmental influences on linear polarisation corrosion rate measurement in reinforced concrete, NDT E Int. 34 (2001) 409-417—each incorporated herein by reference in their entirety. The polarization resistance ($R_p$) and percentage inhibition efficiency (% IE) values obtained from this technique in the absence and presence of different concentrations of gelatin are given in Table 4. The percentage inhibition efficiency of gelatin was calculated using equation 9:

$$IE\ \% = \left(1 - \frac{R_p^o}{R_p}\right) \quad (9)$$

where $R_p^o$ and $R_p$ are values of the polarization resistances in the absence and presence of gelatin. See S. A. Umoren, Polypropylene glycol: A novel corrosion inhibitor for ×60 pipeline steel in 15% HCl solution, J. Mol. Liq. 219 (2016) 946-958—incorporated herein by reference in its entirety. As given in Table 4, significant increase and decrease in $R_p$ values and corrosion rates, respectively, were observed in the presence of gelatin, indicating the gelatin to be a good inhibitor for the carbon steel corrosion in 15% HCl. The $R_p$ value increases while the corrosion rates decreases with increasing gelatin concentrations. The inhibition efficiency was found to increase with increasing concentration of gelatin. The highest gelatin concentration (2.5% w/v) showed an inhibition efficiency of 88.35% (Table 4). This trend is in good agreement with that of the weight loss, EIS and PDP measurements.

ited acid solution. The degradation was considerably decreased in the presence of gelatin (FIG. 6B) which shows a smoother and more even surface for the inhibited acid solution. It has been reported that a smoother surface morphology is as a result of protective layer formation by adsorbed inhibitor molecules. See S. Karim, C. M. Mustafa, M. Assaduzzaman, M. Islam, Effect of nitrite ion on corrosion inhibition of mild steel in simulated cooling water, Chem. Eng. Res. Bull. 14 (2010) 87-91; D. Jayaperumal, Effects of alcohol-based inhibitors on corrosion of mild steel in hydrochloric acid, Mater. Chem. Phys. 119 (2010) 478-484; U. F. Ekanem, S. A. Umoren, I. I. Udousoro, A. P. Udoh, Inhibition of mild steel corrosion in HCl using pineapple leaves (Ananas comosus L.) extract, J. Mater. Sci. 45 (2010) 5558-5566—each incorporated herein by reference in their entirety. In the presence of KI additives in the inhibited acid solution, a more uniform, smoother, and brighter surface morphology could be seen (FIG. 6C). This demonstrates a higher adsorption of the gelatin molecules in the presence of KI additive and further explains the higher corrosion inhibition efficiency of gelatin in the presence of KI additive. Therefore, the addition of the gelatin inhibitor reduces the corrosion that occurs in the free acid solution. Energy dispersive X-ray analysis (EDX) technique was utilized to extract information regarding the nature of the protective films form. The EDX spectra of X60 carbon steel before and after 24 h immersion in 15% HCl in the absence and presence of gelatin are given in FIGS. 7A-7D. The characteristics iron peak intensity of the carbon steel surface before immersion in 15% HCl (FIG. 7A) was observed to decrease drastically after 24 h immersion in 15% HCl without the gelatin inhibitor (FIG. 7B). A higher iron peak intensity than that of the blank 15% HCl was observed in the presence of gelatin inhibitor (Table 6, FIGS. 7C and 7D). The weight % of the polished X60 carbon steel surface decreased from about 95% to 62.18% with high chloride content of 7.32% and oxygen content of 27.73% (Table 5) when immersed in 15% HCl without the gelatin inhibitor for 24 hours, indicating corrosion of the metal surface by the corrosive media (15% HCl). A drastic decrease in chloride content was observed in the presence of the gelatin and

TABLE 4

Potentiodynamic polarization (PDP) and linear polarization resistance (LPR) parameters for X60 carbon steel in 15% HCl in the absence and presence of different gelatin concentrations at 25° C.

| Concn of gelatin (w/v %) | $E_{corr}$ (mV vs. Ag/AgCl) | PDP method | | | | | LPR method | | |
|---|---|---|---|---|---|---|---|---|---|
| | | $I_{corr}$ (μA/cm$^2$) | $\beta_a$ (mV/dec) | $\beta_c$ (mV/dec) | CR (mpy) | IE (%) | $R_p$ (Ω cm$^2$) | CR (mpy) | IE (%) |
| Blank | −401 | 1030 | 85.90 | 124.7 | 301.0 | — | 21.86 | 348.3 | — |
| 0.5 | −428 | 498 | 101.4 | 164.9 | 145.6 | 51.65 | 52.51 | 145.0 | 58.37 |
| 1.5 | −421 | 354 | 94.90 | 182.2 | 103.4 | 65.63 | 68.63 | 110.9 | 68.15 |
| 2.5 | −411 | 329 | 223.8 | 409.0 | 96.23 | 68.06 | 187.7 | 40.57 | 88.35 |

Surface Characterization
SEM/EDX

Figure 6A:
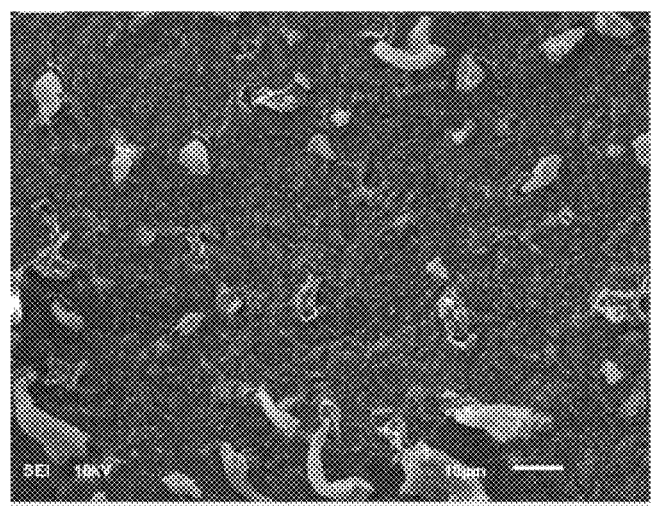
FIGS. 6A-6D illustrate the SEM micrograph of, (a) X60 carbon steel immersed in 15% HCl blank after 24 h (b) X60 carbon steel immersed in 15% HCl in the presence of 2.5% gelatin after 24 h, (c) X60 carbon steel immersed in 15% HCl in the presence of gelatin and KI (d) polished X60 carbon steel coupon after 24 h.
Figure 6B:
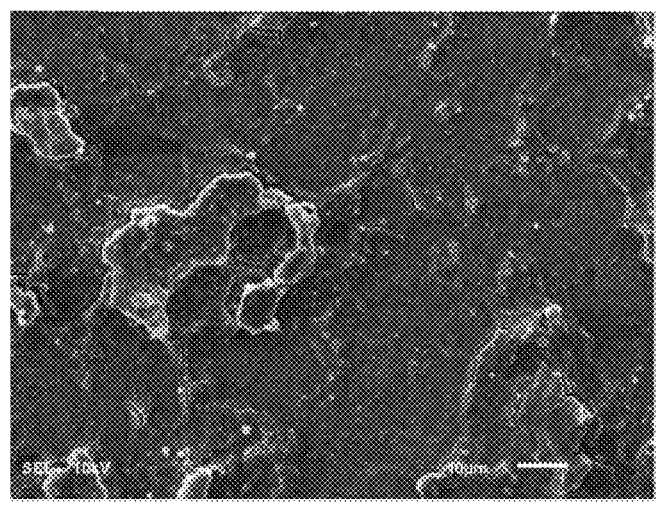
Figure 6C:
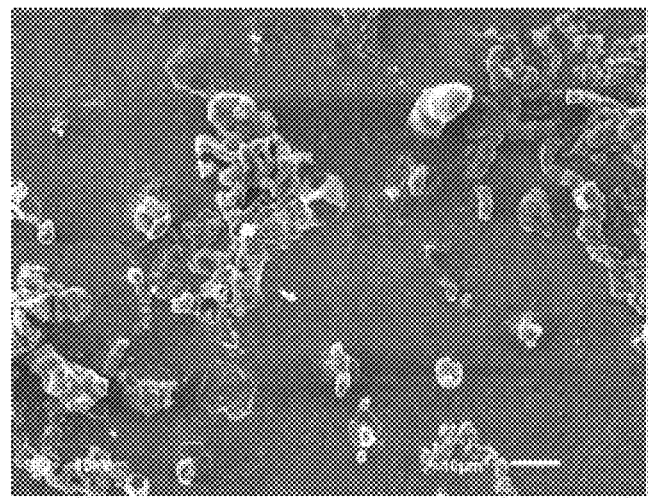
Figure 6D:
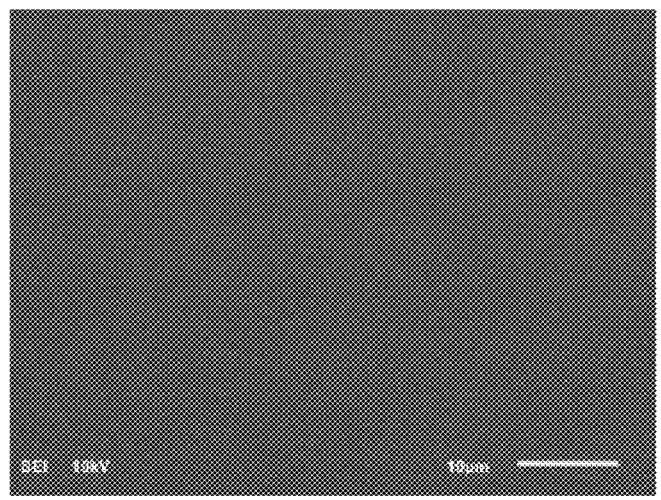
Figure 7A:
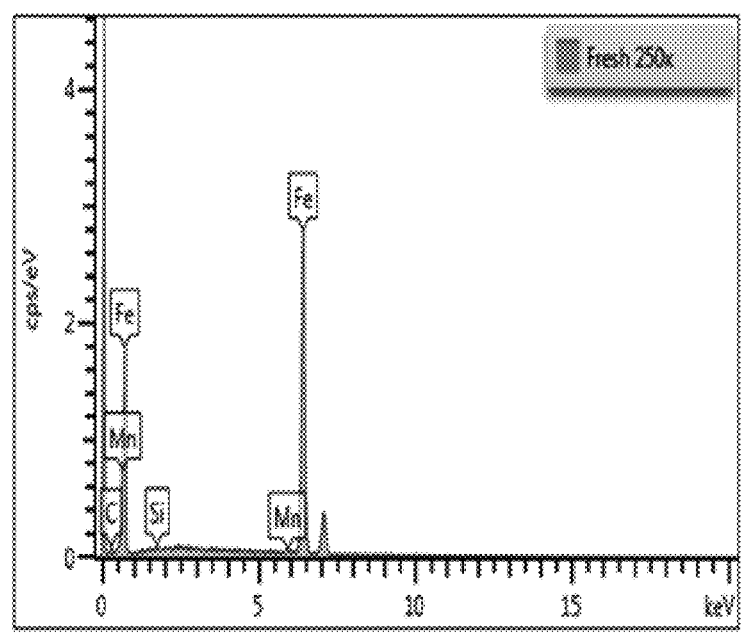
FIGS. 7A-7D illustrate the EDX spectra of (a) polished X60 carbon steel coupon (b) X60 carbon steels immersed in 15% HCl blank after 24 h (b) X60 carbon steel immersed in 15% HCl in the presence of 2.5% gelatin after 24 h, (c) X60 Steel coupon immersed in 15% HCl in the presence of gelatin and KI.
Figure 7B:
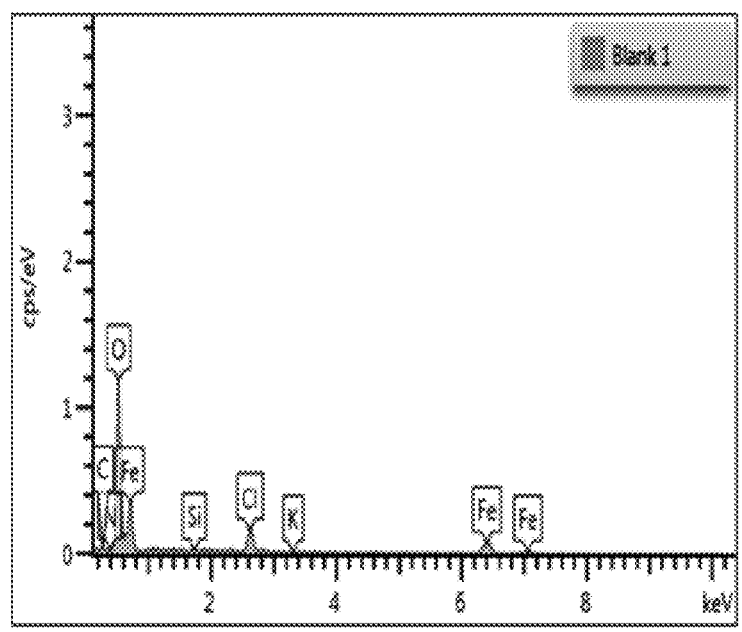
Figure 7C:
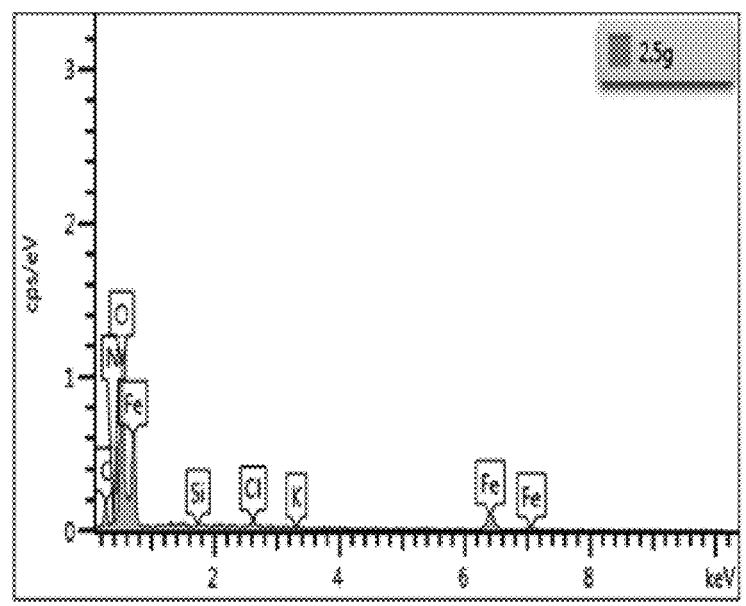
Figure 7D:
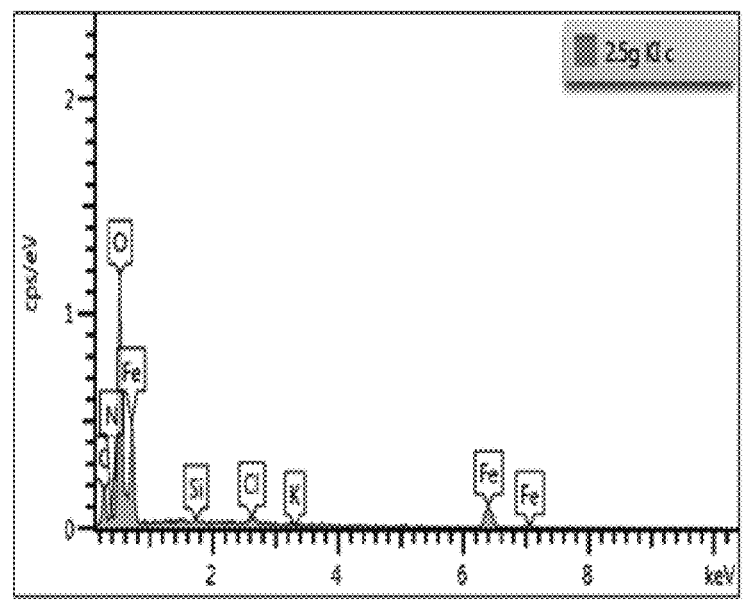

FIGS. 6A-6D show the surface morphology of carbon steel coupons after immersion in 15% HCl, in 15% HCl with gelatin, 15% HCl with gelatin inhibitor in the presence of KI additive and before immersion and polished carbon steel, respectively. The SEM micrographs were taken to prove the inhibition of gelatin on carbon steel corrosion in the acid solution. FIG. 6A shows an uneven surface with large number of rusts distributed over the surface in the uninhibited gelatin with KI (Table 5), indicating the shielding of the iron surface from the corrosive chloride ion. The gelatin inhibitor shields the metal surface by forming a protective film on the metal surface. An additional nitrogen peaks was observed in the presence of the gelatin inhibitor (FIGS. 7C and 7D), indicating that the gelatin inhibitor adsorbed on the metal surface through an interaction between the nitrogen atom of gelatin and the metal surface to form a metal/gelatin complex on the metal surface.

ATR-FTIR

Figure 8:
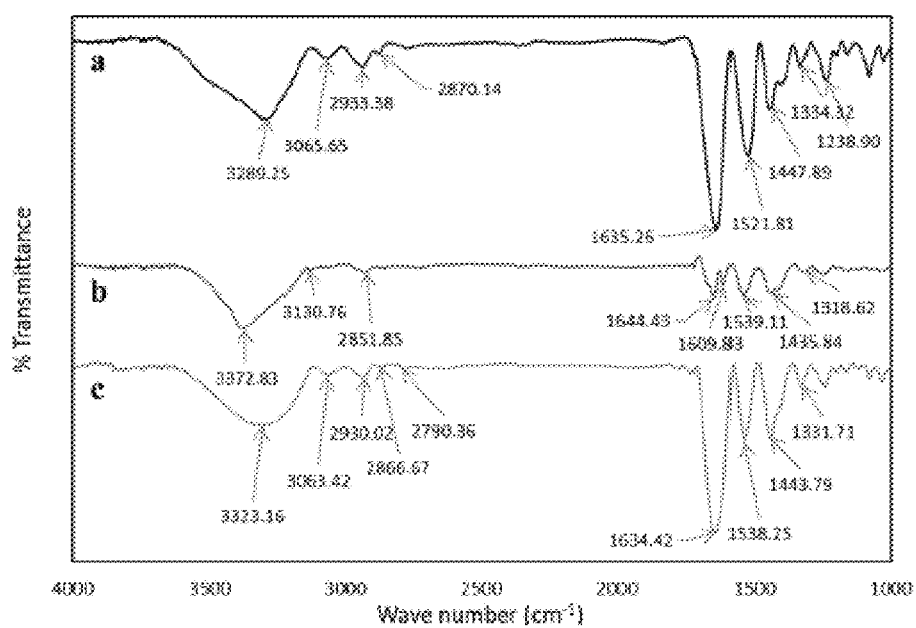
FIG. 8 is a graph illustrating the FT-IR spectra of (a) solid gelatin, (b) surface-adsorbed layer of the carbon steel immersed in 15% HCl in the presence of gelatin and (c) surface-adsorbed layer of mild steel immersed in 15% M HCl in the presence of gelatin and KI.
Figure 9:
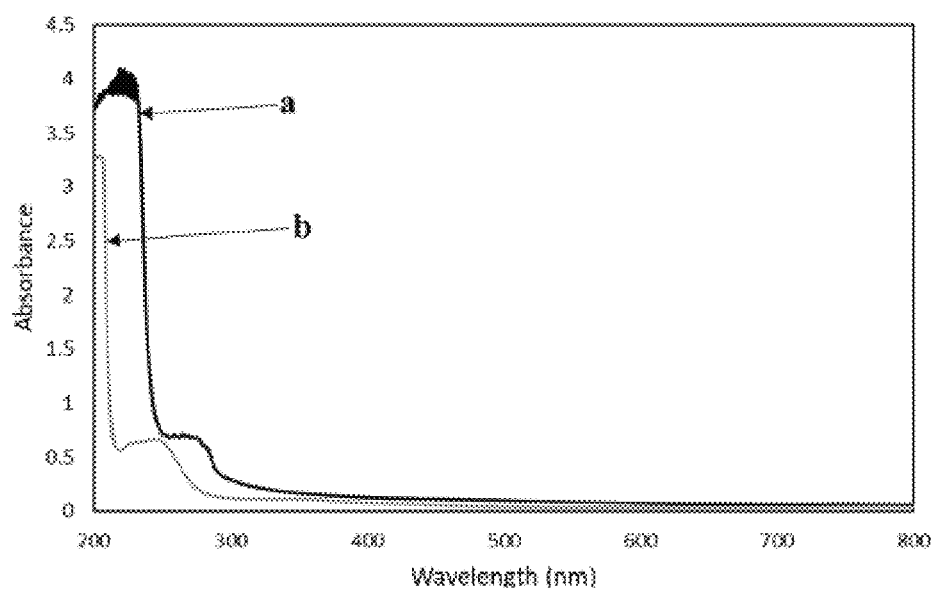
FIG. 9 is a graph illustrating the UV-Visible spectra of (a) 2.5% gelatin in the 15% HCl recorded prior to immersion of the carbon steel, and (b) solution of 2.5% gelatin in the 15% HCl after 24 h immersion of the carbon steel.

The formation of the protective layer containing gelatin on the X60 steel surface was further confirmed by comparing the ATR-FTIR spectrum of pure gelatin (FIG. 8, line a) with that adsorbed on carbon steel immersed in 15% HCl with 2.5% w/v gelatin (FIG. 8, line b) and with 2.5% gelatin and 0.05% KI adsorbed on carbon steel in 15% HCl (FIG. 8, line c). As shown in FIG. 9, the ATR-FTIR spectra of both the X60 surface immersed in 15% HCl with 2.5% gelatin and in 15% HCl with 2.5% gelatin and 0.05% KI are similar to that of the pure gelatin, an indication of the adsorption of the gelatin on the carbon steel surface. The characteristics amide groups (—CO—NH—) are the main absorption band of gelatin. For the pure gelatin (FIG. 8, line a), the most intense band found at 1635 cm$^{-1}$ is assigned to the C=O stretching vibration of the amide groups. See A. Pal, S. Dey, D. Sukul, Effect of temperature on adsorption and corrosion inhibition characteristics of gelatin on mild steel in hydrochloric acid medium, Res. Chem. Intermed. 42 (2016) 4531-4549; J. Hossan, M. A. Gafur, M. R. Kadir, M. Mainul, Preparation and Characterization of Gelatin-Hydroxyapatite Composite for Bone Tissue Engineering, Int. J. Eng. Technol. 14 (2014) 24-32—each incorporated herein by reference in their entirety. The band at 1334 cm$^{-1}$ is attributed to the carboxyl C=O wagging vibration of the proline residue. The amide N—H stretching vibration is ascribed to the broad band distributed at 3289 and a weak band at 3066 cm$^{-1}$ in consistent to previous reported N—H stretching of pure gelatin. A band at 1522 cm$^{-1}$ was assigned to the amide N—H scissoring vibration. See J. Hossan, M. A. Gafur, M. R. Kadir, M. Mainul, Preparation and Characterization of Gelatin-Hydroxyapatite Composite for Bone Tissue Engineering, Int. J. Eng. Technol. 14 (2014) 24-32; K. Haruna, T. A. Saleh, J. Al Thagfi, A. A. Al-Saadi, Structural properties, vibrational spectra and surface-enhanced Raman scattering of 2,4,6-trichloro- and tribromoanilines: A comparative study, J. Mol. Struct. 1121 (2016) 7-15—each incorporated herein by reference in their entirety. The bands at 2933 and 2870 cm$^{-1}$ are assigned to the aliphatic C—H asymmetric and symmetric vibrations respectively. See A. Pal, S. Dey, D. Sukul, Effect of temperature on adsorption and corrosion inhibition characteristics of gelatin on mild steel in hydrochloric acid medium, Res. Chem. Intermed. 42 (2016) 4531-4549—incorporated herein by reference in its entirety. For the ATR-FTIR spectrum of X60 steel immersed in 15% HCl with 2.5% gelatin, the band intensities were found to be lower than that of pure gelatin (FIG. 8, line b). The carboxyl C=O wagging vibration was shifted to a lower frequency (1319 cm$^{-1}$), indicating the formation of a bond between the carboxyl ion and the metal surface. See A. Boskey, N. Pleshko Camacho, FT-IR imaging of native and tissue-engineered bone and cartilage, Biomaterials. 28 (2007) 2465-2478—incorporated herein by reference in its entirety. The amide N—H stretching vibrations bands were shifted to higher frequencies broad band at 3370 cm$^{-1}$ and a weak band at 3131 cm$^{-1}$. The amide C=O stretching vibration was shifted to higher frequency at 1644 cm$^{-1}$ and the aliphatic C—H antisymmetric and symmetric bands were shifted to lower frequencies at 2924 and 2852 cm$^{-1}$ respectively. The above observations suggest adsorption of the gelatin molecules on the carbon steel surface through the amide groups of the protein chain. A higher characteristics band intensities and lesser shift in frequency from the pure gelatin spectra was observed for the ATR-FTIR spectrum of the X60 steel surface immersed in 15% HCl in the presence of 2.5% gelatin+0.05% KI (FIG. 8, line c). This explains the greater adsorption of the gelatin on the carbon steel surface in the presence of KI which explains the greater inhibition efficiency in the presence of KI.

TABLE 5

Elemental composition of the X60 carbon steel specimen before and after immersion in 15% HCl in the absence and presence of gelatin at 25° C.

| Element | Mirror polished X60 steel Wt % | X60 immersed in blask Wt % | X60 immersed in 2.5 w/v % of of gelatin Wt % | X60 immersed in 2.5 w/v % of gelatin + KI Wt % |
|---|---|---|---|---|
| Fe | 98.54 | 62.18 | 65.73 | 66.53 |
| C | 0.93 | 2.40 | 9.16 | 8.81 |
| Si | 0.53 | 0.38 | 0.30 | 0.16 |
| O | — | 27.73 | 21.54 | 22.90 |
| Cl | — | 7.32 | 1.84 | 0.99 |
| N | — | — | 1.32 | 0.61 |

UV-Visible Spectroscopy

The UV-Visible absorption spectra shown in FIG. 9, reveals that after immersion of the mild steel coupon, the absorption band obtained in the UV-visible region shifted to a lower absorbance value. A behavior that has been ascribed to a possible interaction between $Fe^{2+}$ and the inhibitor molecules in the inhibited solution. See M. Finšgar, J. Jackson, Application of corrosion inhibitors for steels in acidic media for the oil and gas industry: A review, Corros. Sci. 86 (2014) 17-41—incorporated herein by reference in its entirety. This can be explained to be due to some electronic transitions, like as n→π or n→π* (involving the non-bonding electrons of the gelatin O and N atoms) and the formation of a surface complex between the metal surface and the inhibitor molecules. See S. Karim, C. M. Mustafa, M. Assaduzzaman, M. Islam, Effect of nitrite ion on corrosion inhibition of mild steel in simulated cooling water, Chem. Eng. Res. Bull. 14 (2010) 87-91—incorporated herein by reference in its entirety. The formed complex acts as the adsorbed protective film that directly reduces the acid attack on the metal surface.

Mechanism of Inhibition of Gelatin on Carbon Steel

Figure 10:
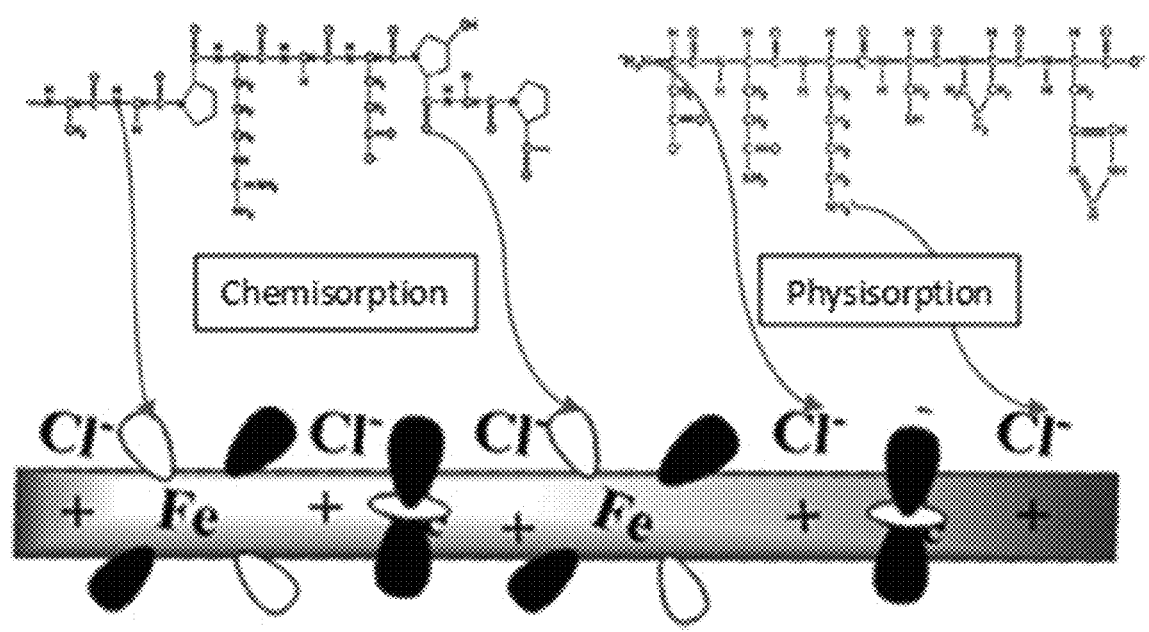
FIG. 10 illustrates a schematic illustration of the adsorption mechanism of gelatin molecules on steel surface in HCl solution.

The inhibition mechanism of carbon steel corrosion in HCl solution by gelatin could be explained by adsorption of the gelatin molecules on the metal surface. This adsorption of the gelatin molecules on the metal surface can be via physical (physisorption), chemical (chemisorption) or both processes as illustrated in FIG. 10. The nitrogen atoms of the gelatin molecules may exist as protonated species in the 15% HCl. These protonated nitrogens in the polypeptide chain might get adsorbed to previously adsorbed chloride ion on the carbon steel surface through an electrostatic interaction (physisorption). See L. Guo, G. Ye, I. B. Obot, X. Li, X. Shen, W. Shi, X. Zheng, Synergistic Effect of Potassium Iodide with L-Tryptophane on the Corrosion Inhibition of Mild Steel: A Combined Electrochemical and Theoretical Study, Int. J. Electrochem. Sci. 12 (2017) 166-177; H. Lgaz, R. Salghi, K. Subrahmanya Bhat, A. Chaouiki, Shubhalaxmi, S. Jodeh, Correlated experimental and theoretical study on inhibition behavior of novel quinoline derivatives for the corrosion of mild steel in hydrochloric acid solution, J. Mol. Liq. 244 (2017) 154-168—each incorporated herein by reference in their entirety. This reduces the evolution of hydrogen which is the predominant cathodic process of corrosion in acidic medium, and hence reduces dissolution of iron. The gelatin molecules may adsorb on the metal surface via donation of lone electrons pairs of N and O atoms to the empty d-orbital of Fe atoms/ions to form an adsorbed layer of gelatin molecules on the neutral iron surface (Equation 10) or a protective $Fe^{2+}Gelatin_{(ads)}$ complex (Equation 11) on the iron surface (chemisorption), which inhibits the anodic dissolution reaction. See L. Guo, G. Ye, I. B. Obot, X. Li, X. Shen, W. Shi, X. Zheng, Synergistic Effect of Potassium Iodide with L-Tryptophane on the Corrosion Inhibition of Mild Steel: A Combined Electrochemical and Theoretical Study, Int. J. Electrochem. Sci. 12 (2017) 166-177—incorporated herein by reference in its entirety.

  (10)

  (11)

Thus, the corrosion inhibition efficacy of gelatin for X60 carbon steel in 15% HCl simulating oil well acidizing environment was investigated and (i) the gelatin shows high inhibition efficiency for the carbon steel in 15% HCl at 25° C. and the inhibition efficiency increases with increasing gelatin concentration; (ii) the inhibition efficiencies obtained from weight loss measurements are comparable with those obtained from EIS, PDP, and LPR measurements; (iii) the gelatin acts as a mixed-type inhibitor, inhibiting both the anodic dissolution of the carbon steel and cathodic evolution of hydrogen; (iv) the gelatin molecules suppress the dissolution of the carbon steel by forming metal/gelatin complex. This complex adsorbed on the metal surface and effectively blocks the steel surface from being attack by the corrosive media; and (v) the SEM-EDX, ATR-FTIR and UV-Visible spectroscopic analysis reveal the gelatin molecules adsorbed on the metal surface through an interaction between the nitrogen and oxygen atoms and the metal surface to form the metal/gelatin complex on the metal surface.

The invention claimed is:

1. A calcareous rock stimulation method with downhole corrosion inhibition in an oil and gas well in a subterranean calcareous geological formation, comprising:
   injecting an acidic treatment fluid into the oil and gas well through metal tubing to react with and/or dissolve rock of the calcareous subterranean geological formation; then
   fracturing the rock, wherein the rock of the calcareous subterranean geological formation is selected from the group consisting of a dolomite, a limestone and a dolomitic sandstone;
   wherein the acidic treatment fluid is an aqueous solution comprising (i) a corrosion inhibitor composition comprising gelatin and an intensifier selected from the group consisting of CuI, KI, and formic acid, and (ii) 14 to 16 wt. % of HCl, based on a total weight of the acidic treatment fluid,
   wherein the gelatin is present in the acidic treatment fluid in a concentration of 0.5 to 2.5 wt. % per total volume of the acidic treatment fluid,
   wherein the intensifier is present in the acidic treatment fluid in a concentration in a range of from 0.01 to 0.05 wt. % per total volume of the acidic treatment fluid,
   wherein the gelatin has a Bloom number in a range of from 50 to less than 220, and
   wherein the gelatin has free carboxyl groups in a range of from 78 to 115 mmol per 100 g of protein.

2. The method of claim 1, wherein the gelatin is Type A gelatin derived from acid-cured porcine skin.

3. The method of claim 1, wherein the gelatin is Type B gelatin derived from lime-cured bovine skin.

4. The method of claim 1, wherein the gelatin is Type A or Type B gelatin derived from fish skin or fish scales.

5. The method of claim 1, wherein the gelatin has a Bloom number in a range of from 150 to less than 220.

6. The method of claim 1, wherein the free carboxyl groups in the gelatin are present in a range of from 78 to 80 mmol per 100 g of protein.

7. The method of claim 1, wherein the free carboxyl groups in the gelatin are present in a range of from 100 to 115 mmol per 100 g of protein.

8. The method of claim 1, wherein the intensifier is KI.

9. The method of claim 1, wherein the corrosion inhibitor composition is substantially free of a cinnamaldehyde compound, an alkoxylated fatty amine, an imidazoline compound, and a carboxylic acid compound having 1 to 12 carbon atoms or an ester or salt thereof.

10. The method of claim 1, wherein the acidic treatment fluid is substantially free of a polysaccharide, a synthetic polymer, a quaternary ammonium surfactant, and an organic solvent.

11. The method of claim 1, wherein the HCl in the acidic treatment fluid is present in a range of from 14 to 15 wt. %.

12. The method of claim 1, wherein the oil and gas well is treated with the acidic treatment fluid at a temperature in a range of from 25 to 180° C.

13. The method of claim 1, wherein the metal tubing is carbon steel.

14. The method of claim 1, which has a corrosion inhibition efficiency of 55 to 85%.

15. The method of claim 1, wherein a corrosion rate of the metal tubing is from 12 to 36 mils penetration per year (mpy).

* * * * *